(12) United States Patent
Colgrove et al.

(10) Patent No.: US 11,247,236 B2
(45) Date of Patent: Feb. 15, 2022

(54) METHOD AND APPARATUSES FOR SCREENING

(71) Applicant: Derrick Corporation, Buffalo, NY (US)

(72) Inventors: James R. Colgrove, East Aurora, NY (US); Clifford C. Smith, North Collins, NY (US)

(73) Assignee: DERRICK CORPORATION, Buffalo, NY (US)

( * ) Notice: Subject to any disclaimer, the term of this patent is extended or adjusted under 35 U.S.C. 154(b) by 0 days.

(21) Appl. No.: 16/507,495

(22) Filed: Jul. 10, 2019

(65) Prior Publication Data
US 2019/0329293 A1   Oct. 31, 2019

Related U.S. Application Data

(62) Division of application No. 16/001,755, filed on Jun. 6, 2018.

(Continued)

(51) Int. Cl.
*B07B 1/46* (2006.01)
*B07B 1/18* (2006.01)
(Continued)

(52) U.S. Cl.
CPC .............. *B07B 1/185* (2013.01); *B01D 29/05* (2013.01); *B01D 29/19* (2013.01); *B01D 29/21* (2013.01);
(Continued)

(58) Field of Classification Search
CPC ......... B07B 1/185; B07B 1/46; B07B 1/4618; B07B 1/4645; B07B 2201/02; B07B 1/18;
(Continued)

(56) References Cited

U.S. PATENT DOCUMENTS

| 3,002,623 A | 10/1961 | Fontaine |
| 3,364,503 A | 1/1968 | Mustee |

(Continued)

FOREIGN PATENT DOCUMENTS

| CA | 1293223 C | 12/1991 |
| CA | 2269314 A1 | 10/2000 |

(Continued)

*Primary Examiner* — Joseph C Rodriguez
(74) *Attorney, Agent, or Firm* — Jason P. Mueller; FisherBroyles, LLP

(57) ABSTRACT

Methods and apparatuses for screening are provided. Embodiments include a screen basket apparatus for screening material, comprising a grid frame having a plurality of openings arranged in a lattice and a plurality of screening cartridge assemblies affixed to the grid frame to cover the respective openings of the grid frame. The screening cartridge assembly includes a case and a screen assembly fitted into the case, and may be affixed to a set of transversal member of the grid frame. The case may be formed of a single injection molded piece integrally formed by injection molding one of a polyurethane or a thermoset polymer. The screening elements together form a generally continuous screening surface across the exterior of the grid frame, which reduces blinding and is resistant to wear and tear.

15 Claims, 30 Drawing Sheets

Related U.S. Application Data

(60) Provisional application No. 62/615,302, filed on Jan. 9, 2018, provisional application No. 62/515,964, filed on Jun. 6, 2017.

(51) Int. Cl.

| | | |
|---|---|---|
| *B01D 33/03* | (2006.01) | |
| *B01D 33/74* | (2006.01) | |
| *B29C 45/00* | (2006.01) | |
| *B29D 28/00* | (2006.01) | |
| *B01D 29/05* | (2006.01) | |
| *B01D 29/19* | (2006.01) | |
| *B01D 29/21* | (2006.01) | |
| *B01D 29/90* | (2006.01) | |
| *B01D 29/92* | (2006.01) | |
| *B01D 39/16* | (2006.01) | |
| *B01D 33/067* | (2006.01) | |
| *B29K 75/00* | (2006.01) | |

(52) U.S. Cl.
CPC ......... *B01D 29/902* (2013.01); *B01D 29/925* (2013.01); *B01D 33/0315* (2013.01); *B01D 33/742* (2013.01); *B01D 39/1692* (2013.01); *B07B 1/46* (2013.01); *B07B 1/469* (2013.01); *B07B 1/4618* (2013.01); *B07B 1/4645* (2013.01); *B29C 45/0001* (2013.01); *B29D 28/00* (2013.01); *B01D 33/067* (2013.01); *B01D 2201/0415* (2013.01); *B01D 2201/184* (2013.01); *B01D 2201/4092* (2013.01); *B01D 2239/1216* (2013.01); *B29K 2075/00* (2013.01)

(58) Field of Classification Search
CPC .... B01D 33/067; B01D 29/05; B01D 29/115; B01D 33/0315; B01D 33/0369; B01D 33/742; B01D 29/19; B01D 29/21; B01D 29/902; B01D 29/925

See application file for complete search history.

(56) References Cited

U.S. PATENT DOCUMENTS

| | | | |
|---|---|---|---|
| 3,377,322 A * | 4/1968 | Witsiepe | C08G 69/00 528/341 |
| 3,390,771 A | 7/1968 | Wehner | |
| 3,401,800 A | 9/1968 | Stock | |
| 3,713,541 A | 1/1973 | Nelson | |
| 4,028,230 A | 6/1977 | Rosenblum | |
| 4,100,248 A | 7/1978 | Adams | |
| 4,141,821 A | 2/1979 | Wolff | |
| 4,184,944 A | 1/1980 | Tytko | |
| 4,188,208 A | 2/1980 | Guay | |
| 4,190,527 A | 2/1980 | Spiller | |
| 4,222,865 A * | 9/1980 | Valeri | B07B 1/185 209/399 |
| 4,265,742 A | 5/1981 | Buecher et al. | |
| 4,361,239 A | 11/1982 | Kumandan | |
| 4,383,919 A | 5/1983 | Schmidt | |
| 4,452,656 A | 6/1984 | Benson et al. | |
| 4,526,682 A | 7/1985 | Wallace | |
| 4,569,761 A | 2/1986 | Spiewok et al. | |
| 4,640,810 A | 2/1987 | Laursen | |
| 4,674,251 A | 6/1987 | Wolff | |
| 4,819,809 A | 4/1989 | Derrick | |
| 4,857,176 A | 8/1989 | Derrick et al. | |
| 4,885,040 A | 12/1989 | Wolff | |
| 4,932,112 A | 6/1990 | Tikkanen | |
| 4,986,900 A | 1/1991 | Mason | |
| 5,073,254 A | 12/1991 | Beisenherz et al. | |
| 5,149,739 A | 9/1992 | Lee | |
| 5,238,117 A | 8/1993 | Hunter | |
| 5,282,538 A | 2/1994 | Moys | |
| 5,332,101 A | 7/1994 | Bakula | |
| 5,372,261 A | 12/1994 | Galton et al. | |
| 5,378,364 A | 1/1995 | Welling | |
| 5,385,669 A | 1/1995 | Leone, Sr. | |
| 5,437,374 A | 8/1995 | Bills et al. | |
| 5,472,096 A | 12/1995 | Prinsloo | |
| 5,558,042 A | 9/1996 | Bradley et al. | |
| 5,575,618 A | 11/1996 | Brandon et al. | |
| 5,626,234 A | 5/1997 | Cook et al. | |
| 5,672,267 A | 9/1997 | Terblanche | |
| 5,816,413 A * | 10/1998 | Boccabella | B07B 1/4645 209/399 |
| 5,868,260 A | 2/1999 | Bosman et al. | |
| 5,876,552 A | 3/1999 | Bakula | |
| 5,971,159 A | 10/1999 | Leone et al. | |
| 6,033,564 A | 3/2000 | Kirker et al. | |
| 6,050,423 A | 4/2000 | Dunnuck et al. | |
| 6,092,667 A | 7/2000 | Steinmuller et al. | |
| 6,253,926 B1 | 7/2001 | Woodgate | |
| 6,267,246 B1 | 7/2001 | Russell et al. | |
| 6,318,565 B1 | 11/2001 | Diemer et al. | |
| 6,461,499 B1 | 10/2002 | Bosman | |
| 6,530,484 B1 | 3/2003 | Bosman | |
| 6,564,947 B2 | 5/2003 | Bakula | |
| 6,565,698 B1 | 5/2003 | Adams et al. | |
| 6,669,027 B1 | 12/2003 | Mooney | |
| 6,715,613 B2 | 4/2004 | Eeles et al. | |
| 6,759,000 B2 | 7/2004 | Cook et al. | |
| 6,820,748 B2 | 11/2004 | Fallon | |
| 6,915,910 B2 | 7/2005 | Lutz et al. | |
| 7,000,777 B2 | 2/2006 | Adams et al. | |
| 7,063,214 B2 | 6/2006 | Schulte, Jr. et al. | |
| 7,090,083 B2 | 8/2006 | Russell et al. | |
| 7,216,768 B2 | 5/2007 | Fisher et al. | |
| 7,228,971 B2 | 6/2007 | Mooney et al. | |
| 7,374,050 B2 * | 5/2008 | Grace | B01D 33/09 210/404 |
| 7,389,882 B2 * | 6/2008 | Cady | B07B 1/06 209/405 |
| 7,413,087 B2 | 8/2008 | Kriel | |
| 7,467,715 B2 * | 12/2008 | Johnson | B07B 1/46 209/399 |
| 7,484,625 B2 | 2/2009 | Scott et al. | |
| 7,578,394 B2 | 8/2009 | Wojciechowski et al. | |
| 7,654,395 B2 * | 2/2010 | Johnson | B07B 1/4609 209/399 |
| 7,735,656 B1 | 6/2010 | Bassler | |
| 7,810,649 B2 | 10/2010 | Robertson | |
| 7,819,254 B2 | 10/2010 | Robertson | |
| 7,819,255 B2 | 10/2010 | Cady | |
| 7,909,172 B2 * | 3/2011 | Carr | B07B 1/4645 209/405 |
| 7,942,353 B2 | 5/2011 | Cerra et al. | |
| 7,959,009 B2 | 6/2011 | Weaver et al. | |
| 7,992,719 B2 * | 8/2011 | Carr | B07B 1/4663 209/405 |
| 8,025,154 B2 | 9/2011 | Kriel | |
| 8,113,357 B2 | 2/2012 | Johnson et al. | |
| 8,127,932 B2 * | 3/2012 | Trench | B07B 1/4645 209/319 |
| 8,281,934 B1 | 10/2012 | Connolly | |
| 8,371,450 B2 | 2/2013 | McGregor et al. | |
| 8,393,474 B2 | 3/2013 | Robertson | |
| 8,408,397 B2 * | 4/2013 | Cady | B07B 1/4645 209/392 |
| 8,439,203 B2 | 5/2013 | Wojciechowski et al. | |
| 8,443,984 B2 | 5/2013 | Wojciechowski et al. | |
| 8,469,198 B2 * | 6/2013 | Hetu | B07B 1/4627 209/305 |
| 8,544,655 B2 | 10/2013 | Trench et al. | |
| 8,584,866 B2 | 11/2013 | Lipa et al. | |
| 8,596,464 B2 | 12/2013 | Robertson | |
| 8,827,545 B2 | 9/2014 | Kalidindi | |
| 9,010,539 B2 | 4/2015 | Lipa et al. | |
| 9,050,607 B2 * | 6/2015 | Heley | B04B 7/16 |
| 9,056,335 B2 * | 6/2015 | Wojciechowski | B07B 1/4645 |
| 9,149,841 B2 | 10/2015 | Ghosh | |
| 9,156,061 B2 | 10/2015 | Robertson | |

(56) References Cited

U.S. PATENT DOCUMENTS

| | | |
|---|---|---|
| 9,180,493 B2 * | 11/2015 | Dahl .................... B07B 1/4618 |
| 9,327,318 B2 | 5/2016 | Paul et al. |
| 9,364,864 B2 | 6/2016 | Paul |
| 9,375,756 B2 | 6/2016 | Lipa et al. |
| 9,403,192 B2 | 8/2016 | Lipa et al. |
| 9,409,209 B2 | 8/2016 | Wojciechowski |
| 9,610,614 B2 * | 4/2017 | Woodgate ............ B07B 1/4609 |
| 9,744,564 B2 | 8/2017 | Cady |
| 9,782,705 B2 * | 10/2017 | Thrasher ............... F26B 11/026 |
| 9,884,344 B2 | 2/2018 | Wojciechowski |
| 9,908,150 B2 | 3/2018 | Lipa et al. |
| 10,046,363 B2 | 8/2018 | Wojciechowski |
| 10,086,408 B2 * | 10/2018 | Cady .................. B01D 33/0376 |
| 10,259,013 B2 | 4/2019 | Wojciechowski |
| 10,363,576 B2 | 7/2019 | Schenk |
| 2002/0033358 A1 | 3/2002 | Bakula |
| 2002/0112998 A1 | 8/2002 | Bosman |
| 2002/0153287 A1 | 10/2002 | Fallon |
| 2004/0211707 A1 | 10/2004 | Lipa |
| 2005/0133465 A1 | 6/2005 | Derrick et al. |
| 2005/0183991 A1 | 8/2005 | Kriel |
| 2005/0274653 A1 | 12/2005 | LaVeine et al. |
| 2007/0151920 A1 | 7/2007 | Kay |
| 2007/0187302 A1 | 8/2007 | Parra Huerta |
| 2007/0187303 A1 * | 8/2007 | Fisher ................ B01D 33/0376 209/404 |
| 2007/0195143 A1 | 8/2007 | Andrews |
| 2008/0078703 A1 | 4/2008 | Robertson |
| 2008/0121568 A1 | 5/2008 | McGregor et al. |
| 2009/0139909 A1 | 6/2009 | Robertson |
| 2009/0166268 A1 | 7/2009 | Malmberg |
| 2009/0301945 A1 | 12/2009 | Trench et al. |
| 2009/0321328 A1 | 12/2009 | Wojciechowski et al. |
| 2010/0270215 A1 | 10/2010 | Robertson et al. |
| 2010/0276343 A1 * | 11/2010 | Hukki ....................... B07B 1/46 209/405 |
| 2011/0094950 A1 | 4/2011 | Dahl |
| 2011/0139688 A1 | 6/2011 | Carr et al. |
| 2011/0155653 A1 | 6/2011 | Robertson et al. |
| 2011/0306719 A1 | 12/2011 | Hilmer et al. |
| 2012/0006735 A1 | 1/2012 | Ralph |
| 2012/0080362 A1 | 4/2012 | Trench et al. |
| 2013/0168387 A1 | 7/2013 | Carvajal et al. |
| 2013/0240652 A1 | 9/2013 | Gardner et al. |
| 2013/0277281 A1 | 10/2013 | McClung, III |
| 2013/0277282 A1 | 10/2013 | Lipa et al. |
| 2013/0313168 A1 * | 11/2013 | Wojciechowski .... B07B 1/4645 209/275 |
| 2014/0262978 A1 | 9/2014 | Wojciechowski |
| 2014/0327171 A1 | 11/2014 | Thierry et al. |
| 2014/0342110 A1 | 11/2014 | Zhu et al. |
| 2015/0197827 A1 | 7/2015 | Perkins et al. |
| 2015/0239014 A1 | 8/2015 | Lipa et al. |
| 2015/0283583 A1 | 10/2015 | Woodgate et al. |
| 2016/0101377 A1 | 4/2016 | Cady et al. |
| 2016/0129477 A1 | 5/2016 | Racherla |
| 2016/0303611 A1 | 10/2016 | Lipa et al. |
| 2018/0185879 A1 | 7/2018 | Torres Jara |
| 2018/0185880 A1 | 7/2018 | Wojciechowski |
| 2018/0243797 A1 | 8/2018 | Wojciechowski |
| 2018/0312667 A1 | 11/2018 | Colgrove et al. |
| 2018/0345319 A1 * | 12/2018 | Colgrove ................ B07B 1/185 |
| 2019/0076881 A1 * | 3/2019 | Colgrove .............. B07B 1/4645 |
| 2019/0329293 A1 | 10/2019 | Colgrove et al. |
| 2020/0190768 A1 | 6/2020 | Cangini |

FOREIGN PATENT DOCUMENTS

| | | |
|---|---|---|
| CL | 2015002761 | 11/2016 |
| CL | 201903555 | 12/2019 |
| CL | 202001397 | 5/2020 |
| CN | 101716573 | 6/2010 |
| CN | 20185517 | 6/2011 |
| DE | 2924571 A1 | 1/1981 |
| DE | 3542635 C1 | 2/1987 |
| DE | 102009010684 A1 | 9/2010 |
| DE | 102011119344 | 4/2013 |
| DE | 102014009702 B3 | 8/2015 |
| EA | 15159 | 6/2011 |
| EA | 201170173 | 6/2011 |
| EM | 00076997-0001 | 8/2007 |
| EM | 001153464-0003 | 9/2009 |
| EM | 002241158-0002 | 5/2013 |
| EM | 002303412-0012 | 5/2013 |
| EM | 002667436-0001 | 3/2015 |
| EM | 004496263-0002 | 6/2017 |
| EP | 1205265 A2 | 5/2002 |
| GB | 2185698 | 7/1987 |
| GB | 2203061 | 12/1988 |
| GB | 2497873 A | 6/2013 |
| JP | 2008255145 A | 10/2008 |
| JP | 2017518860 | 7/2017 |
| KR | 20-0191289 | 8/2000 |
| KR | 20100005723 | 6/2010 |
| KR | 101067391 | 9/2011 |
| KR | 1020140027283 A | 3/2014 |
| RU | 2241550 | 12/2004 |
| RU | 2296630 | 2/2006 |
| RU | 2361684 | 7/2009 |
| RU | 2543393 | 2/2015 |
| SU | 1599133 | 10/1990 |
| TW | M258183 U | 3/2005 |
| TW | M328904 U | 3/2008 |
| TW | M340860 U | 9/2008 |
| TW | 200925535 A | 6/2009 |
| TW | M447274 U | 2/2013 |
| TW | M459903 U | 8/2013 |
| TW | M468568 U | 12/2013 |
| TW | M470701 U | 1/2014 |
| TW | M481766 U | 7/2014 |
| TW | M513735 U | 12/2015 |
| TW | M527789 U | 9/2016 |
| TW | M529549 U | 10/2016 |
| TW | M532900 U | 12/2016 |
| TW | M544259 U | 7/2017 |
| TW | M556176 U | 3/2018 |
| WO | 0053343 A1 | 9/2000 |
| WO | 2000053343 A1 | 9/2000 |
| WO | 0197947 A1 | 12/2001 |
| WO | 2001097947 A1 | 12/2001 |
| WO | 20010097947 A1 | 12/2001 |
| WO | 2007079270 A2 | 7/2007 |
| WO | 2008115673 A1 | 9/2008 |
| WO | 2008141373 A1 | 11/2008 |
| WO | 2010/066543 | 6/2010 |
| WO | 2010069970 | 6/2010 |
| WO | 20100069970 A1 | 6/2010 |

* cited by examiner

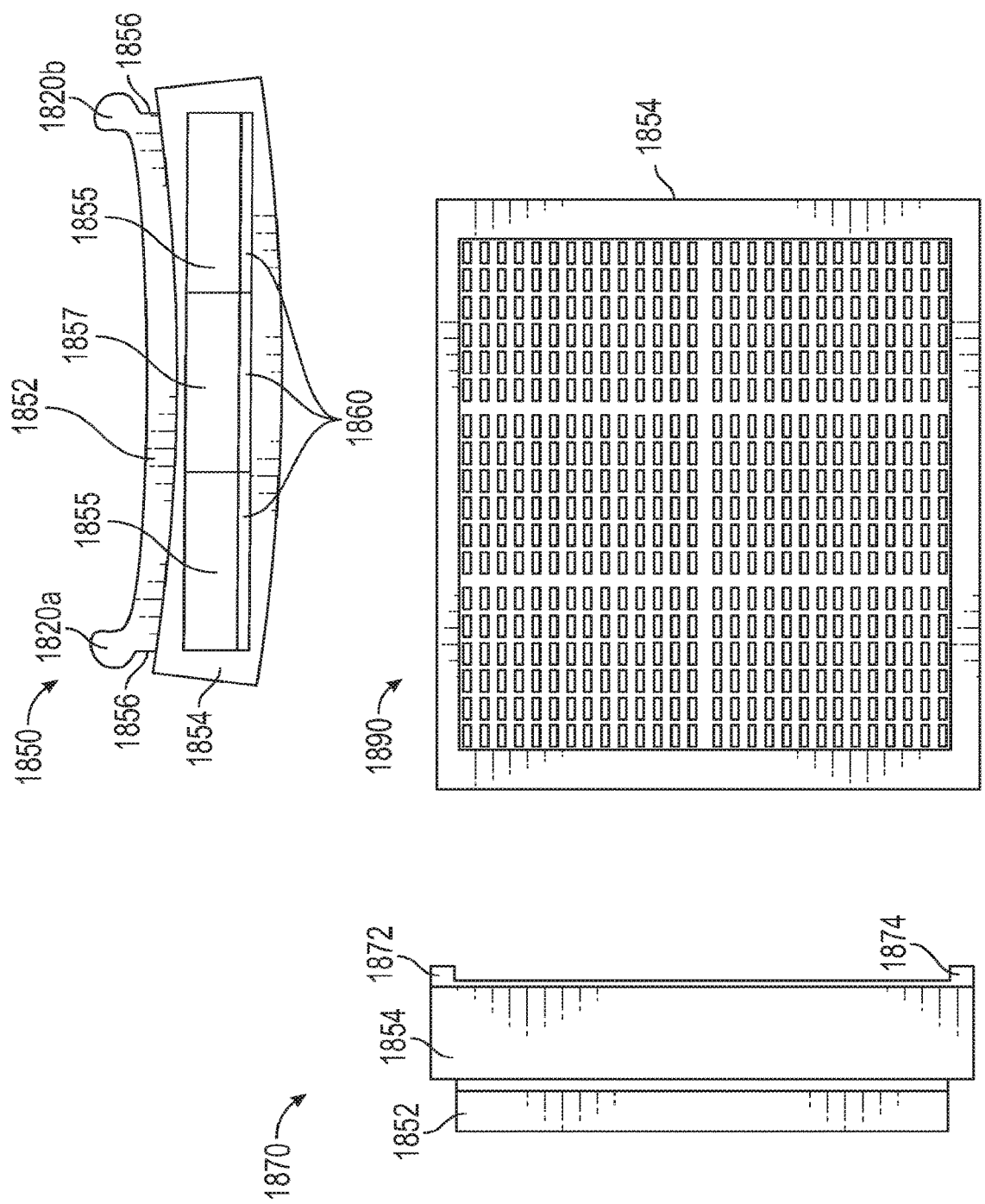

METHOD AND APPARATUSES FOR SCREENING

CROSS REFERENCE TO RELATED APPLICATIONS

This application is a divisional of U.S. patent application Ser. No. 16/001,755, filed Jun. 6, 2018, which claims the benefit of U.S. Provisional Patent Application No. 62/515,964, filed Jun. 6, 2017, and U.S. Provisional Patent Application No. 62/615,302, filed Jan. 9, 2018, the entire contents of each of which are incorporated herein by reference.

BRIEF DESCRIPTION OF DRAWINGS

Various aspects and features of the present disclosure are described herein with reference to the drawings. Like numbers refer to like, but not necessarily the same or identical, elements throughout.

FIG. 18B shows cross-sectional and side views of the example screening cartridge assembly shown in FIG. 18A. Example dimensions, in units of inches, are presented in the views. The disclosure is not limited to such dimensions, and other dimensions can be contemplated.

DESCRIPTION OF EMBODIMENTS

Figure 1:
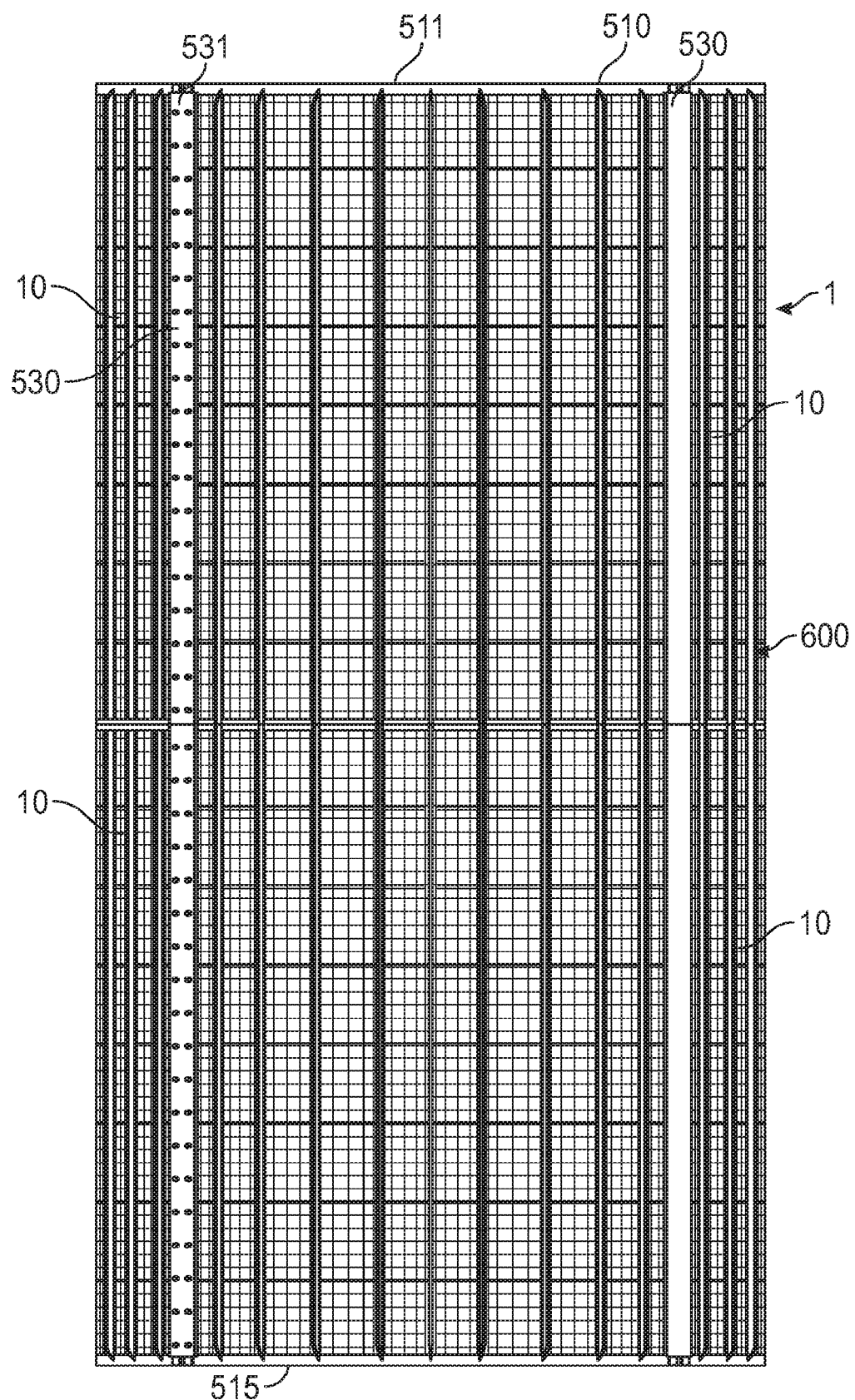
FIG. 1 shows a side view of a screen basket, according to an example embodiment of the present disclosure.

The present disclosure relates to apparatuses and methods for filtering, and particularly to the use of improved screen baskets to be used in methods and systems for sorption of metals from metal-containing ore. Embodiments of the present disclosure may be utilized with carbon-in-pulp (CIP), carbon-in-leach (CIL), and resin-in-leach (RIL) systems, among others. CIL and CIP systems are, for example, two counter-current methods for adsorbing leached gold from a pulp stream onto activated carbon. In such CIL and CIP processes, a plurality of adsorption tanks are placed in a series. Pulp flows continuously from the first tank of this series to the last tank. Simultaneously, carbon is pumped counter-current from the last tank of the series to the first tank. CIP and CIP processes differ in the extent to which gold is leached prior to carbon adsorption. For example, in CIL operation, carbon is added to the leaching tanks, and the leaching reaction and adsorption occur simultaneously. In contrast, in the CIP process, the majority of the leachable gold is leached out before the first adsorption stage.

A description of a general process of recovering gold from a gold-bearing ore, employing a combined cyanidation and adsorption treatment, may be found in U.S. Pat. No. 4,188,208. Although embodiments of the present disclosure are generally discussed with reference to gold or carbon, embodiments of the present disclosure may be equally applied to processes for recovering silver, iron, nickel, and other metals from the appropriate ore. The recovery of any metal from a mined ore is within the scope of the present disclosure.

A description of existing metal screen baskets and methods of use thereof in the above-described CIP processes may be found in U.S. Pat. No. 5,238,117. The process described in U.S. Pat. No. 5,238,117 have generally become known in the art as "NKM" vertically swept interstage screening processes, and the screen baskets used therein have generally become known in the art as NKM screen baskets. Generally, such NKM screen baskets include a metal support frame provided with a wedge wide screen wrapped around a peripheral sidewall thereof. The wedge wire screen is used to filter materials from a metal-rich pulp. The screen basket is attached to an NKM screening device, and a lower portion of this NKM screening device, including the attached NKM screen basket, is immersed in a tank containing carbon-in-pulp material. Impellers on the NKM screening device cause the pulp in the tank to follow through the wedge wire screen and into the interior of the NKM screen. However, the wedge wire screen has a very low open screening area, which leads to inefficient screening. The low open screening area also leads to clogging. Clogging, in turn, forces increased volumes of pulp to flow through the unclogged areas of the wedge wire screen, which increases the wear rate of the screen. Additionally, the individual wires that form the wedge wire screens tend to deteriorate or break over time due to forces encountered during screening processes, such as sweeping of internal and external propulsion blades.

In exemplary embodiments of the present disclosure, an improved screen basket device for screening material is provided. The device comprises a support frame having a substantially closed bottom and an open top, and a substantially cylindrical sidewall support portion extending between the bottom and top of the support frame. The support frame may be metal, such as stainless steel. A polyurethane screen sidewall extends around and is supported by the sidewall support portion. The polyurethane screen sidewall comprises a high open-area polyurethane screen. In certain embodiments, the polyurethane screen sidewall substantially encloses the sidewall support portion between the closed bottom and open top to thereby provide a maximized screening area. The polyurethane screen sidewall may be affixed to an outer periphery of the sidewall support portion.

The polyurethane screen sidewall may be formed from a plurality of individual polyurethane screen members. These individual polyurethane screen members may be aligned adjacent to one another to provide a generally continuous screening area across the screen sidewall. In one example, the plurality of individual polyurethane screen members may include eight individual polyurethane screen members. In such embodiments, these eight individual polyurethane screen members may be arranged such that four of the screen members are on a lower half of the support frame and four of the screen members are on an upper half of the support frame.

In certain embodiments, the substantially closed bottom may be provided with a centralized aperture that allows receipt of the drive shaft of an NKM apparatus.

The high open-area polyurethane screen member, in certain embodiments, comprises a flexible molded polyurethane body; screen openings in the body; a set of first, substantially parallel flexible members defining opposite first sides of the screen openings; a set of second, substantially parallel flexible members defining second opposite sides of the screen openings, whereby the second members are substantially perpendicular to the second members; a set of third, substantially parallel members having multiple first members therebetween; a set of fourth, substantially parallel members having multiple second members therebetween; side edge portions substantially parallel at opposite sides of the body, between which the third members therein extend; and a first end portion and a second end portion substantially parallel at opposite ends of the body, between which the fourth members therein extend, whereby the end portions are substantially perpendicular to the edge portions. Screen openings in the flexible molded polyurethane body of the polyurethane screen member may be about 0.044 mm to about 4.000 mm between inner surfaces of the first members, and about 0.044 mm to about 60.000 mm between inner surfaces of the second members.

The polyurethane screen member can also include reinforcement members molded integrally within at least one of the first and third members and at least one of the second and fourth members. In some embodiments, the reinforcement members integrally formed within the first members may have a substantially uniform thickness having a magnitude in the range of about 0.006 inches to about 0.015 inches. The reinforcement members molded integrally with the second members may have a substantially uniform thickness having a magnitude in a range of about 0.015 inches to about 0.040 inches. The reinforcement members may be embodied in, for example, rods that can be molded integrally with the members. The reinforcement members may also be embodied in, for example, aramid fibers that are at least one of a twisted and a woven multistrand, with the fibers having a linear density of about 55 denier to about 2840 denier.

The side edge portions of the polyurethane screen member may be configured for use in attaching the screen member to the support frame. A plurality of enlarged polyurethane ribs can be integrally formed on an exterior surface of the polyurethane screen body, with the ribs arranged substantially vertical relative to the sidewall support portion. Each of the plurality of ribs may extend substantially from a top to a bottom of the polyurethane screen member.

In further embodiments of the present disclosure, a basket cage may be provided that includes a tubular, or substantially cylindrical grid frame with multiple openings. The multiple openings in the grid frame can be arranged in a square lattice, and each one (or, in some embodiments, at least some) of the multiple openings can have a square shape. In an example embodiment, the multiple openings can include 264 square openings. A subset of the multiple openings can be defined by longitudinal members and transversal members. A second subset of the multiple openings can be defined by longitudinal members and transversal segments of a first annular section of the grid frame, and, similarly, a third subset of the multiple openings can be defined by longitudinal members and transversal segments of a second annular section of the grid frame.

The basket cage may feature flanges at the top and bottom of the cage. The top flange and openings can permit or otherwise facilitate mounting a plate or another type of cover on the flange. In addition or in other embodiments, the flange and openings can permit or otherwise facilitate mounting the basket cage into a screen separator machine (e.g., an NKM vertically swept interstage apparatus).

The basket cage can be utilized in a separation process to separate specific particulate matter from slurry or another type of fluid source. To that end, in one embodiment, screening cartridge assemblies can be mounted to the basket cage, where the screening cartridge assemblies can permit or otherwise facilitate the separation of specific particulate matter from the slurry. Each one of the screening cartridge assemblies can be mounted or otherwise affixed to a respective group of grid members that define, at least in part, a respective opening of the grid frame. For openings in a row about the longitudinal axis of the grid frame, a group of grid members that support a first one of the screening cartridge assemblies can have a common grid member with another group of grid members that support a second one of the screening cartridge assemblies.

In some embodiments, each one of the multiple screening cartridge assemblies mounted or affixed to the grid frame includes a screening assembly and a case (or another type of container) configured to receive and hold the screen assembly. In some embodiments, the case can be embodied in a single injection molded piece integrally formed by means of injection molding a polyurethane, a thermoset polymer, or other types of polymer. Example embodiments of the injection molded piece and the process of forming the injection molded piece are discussed in more detail in the disclosures of U.S. patent application Ser. No. 13/800,826, U.S. Pat. Nos. 9,409,209, 9,884,344, U.S. patent application Ser. No. 15/851,009, U.S. patent application Ser. No. 15/965,195, and the cross-references included therein, which are hereby incorporated by reference herein in their entireties.

The screen assembly has, in some embodiments, three individual screen units. The case includes a first opening configured to receive and/or fit the screen assembly within the case, and a second opening that permits exposing a screening surface of the screen assembly to an exterior of the grid frame. The case also includes ridges that extend from a first edge of the case, near the first opening, to an opposing second edge of the case. The ridges and respective portions of the case form respective recesses that permit or otherwise facilitate mounting (e.g., gripping or clipping) the case to the grid frame.

The entirety or substantially the entirety of the grid frame of the screen basket can be covered with screening cartridge assemblies in operation of a separation process. As such, in an example embodiment, 264 screening cartridge assemblies can be mounted to the respective 264 square openings in the grid frame.

Further, the case can include an attachment frame section and a holder frame section. The holder frame section can receive and/or hold the screen assembly formed by screen units. The attachment frame section can include a set of ridges that form respective recesses, which in turn permit or otherwise facilitate attachment (e.g., by clipping, clutching, or otherwise engaging) of the screening cartridge assembly to a grid frame.

Screen cartridges according to the present disclosure may be any suitable shape for attachment to a grid frame of a basket cage. For example and without limitation, the screen cartridges may be of a square shape, or rectangular, or ovular, or any other shape. Although example embodiments may provide for screen cartridges that are shaped to substantially match the grid openings of the grid frame (i.e., a square screen cartridge on a grid frame with square grid openings), screen cartridges of varying shapes may be affixed to grid openings a different shape. Similarly, the grid frame of the basket cage may be of any suitable shape for screening.

Screen elements and screen cartridges according to the embodiments discussed herein resist wear, abrasion, bending, and chemicals better than metal, and thus tend to last longer than wedge wire frames in CIL processes. Screen elements as discussed herein also allow for the formation of significantly smaller screen openings than those of conventional wedge wire frames, which in turn improves screening efficiency. Use of the screen members as described herein provides for significantly larger screening areas, and significantly reduces blinding as compared to conventional wedge wire screen baskets. In use, screen elements and screen cartridges as described herein also allow for a substantially consistent distance between the external propulsion blades of the screening apparatus and the screening cartridge assembly, thereby reducing clogging and elongating the life of the screen elements.

Referring now to the embodiment shown in FIGS. 1 to 5, the screen basket 1 of the present disclosure comprises a basket frame structure 510 that has a high open-area polyurethane screen 600 attached thereto.

Figure 2:
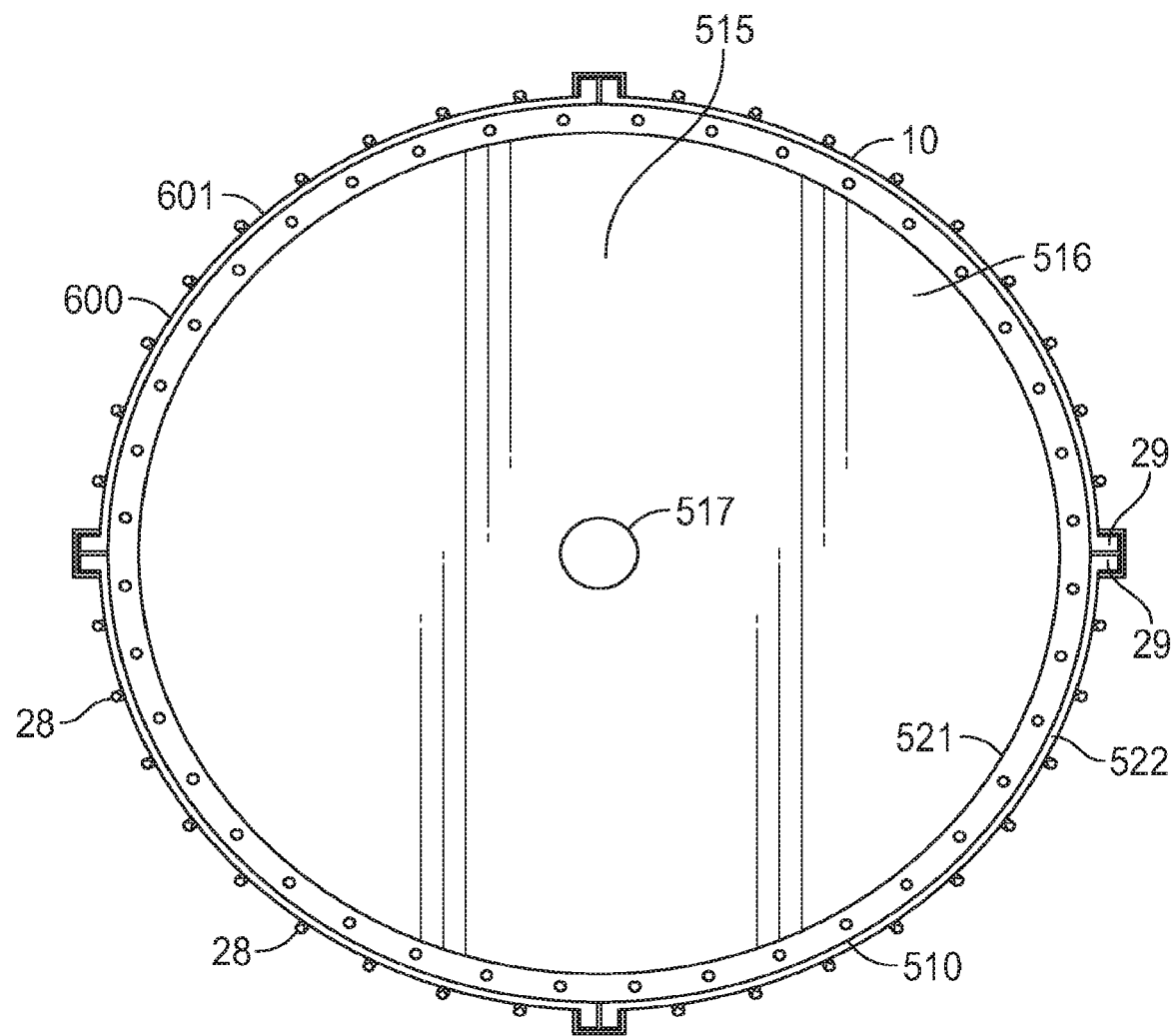
FIG. 2 shows a top view of a screen basket, according to an example embodiment of the present disclosure.

As indicated in FIG. 1, the basket frame 510 generally has a cylindrical configuration, although other shapes may be used. The basket frame 510 may preferably be formed of stainless steel, although other materials may be used. The frame has an upper end 511 and a lower end 515, and includes a plurality of vertical support members 530 forming a vertical support portion extending between the upper and lower ends 511, 515 of the frame 510. As shown in FIG. 2, the vertical support portion of the frame 510 has an interior side 521 and an exterior side 522.

Figure 3:
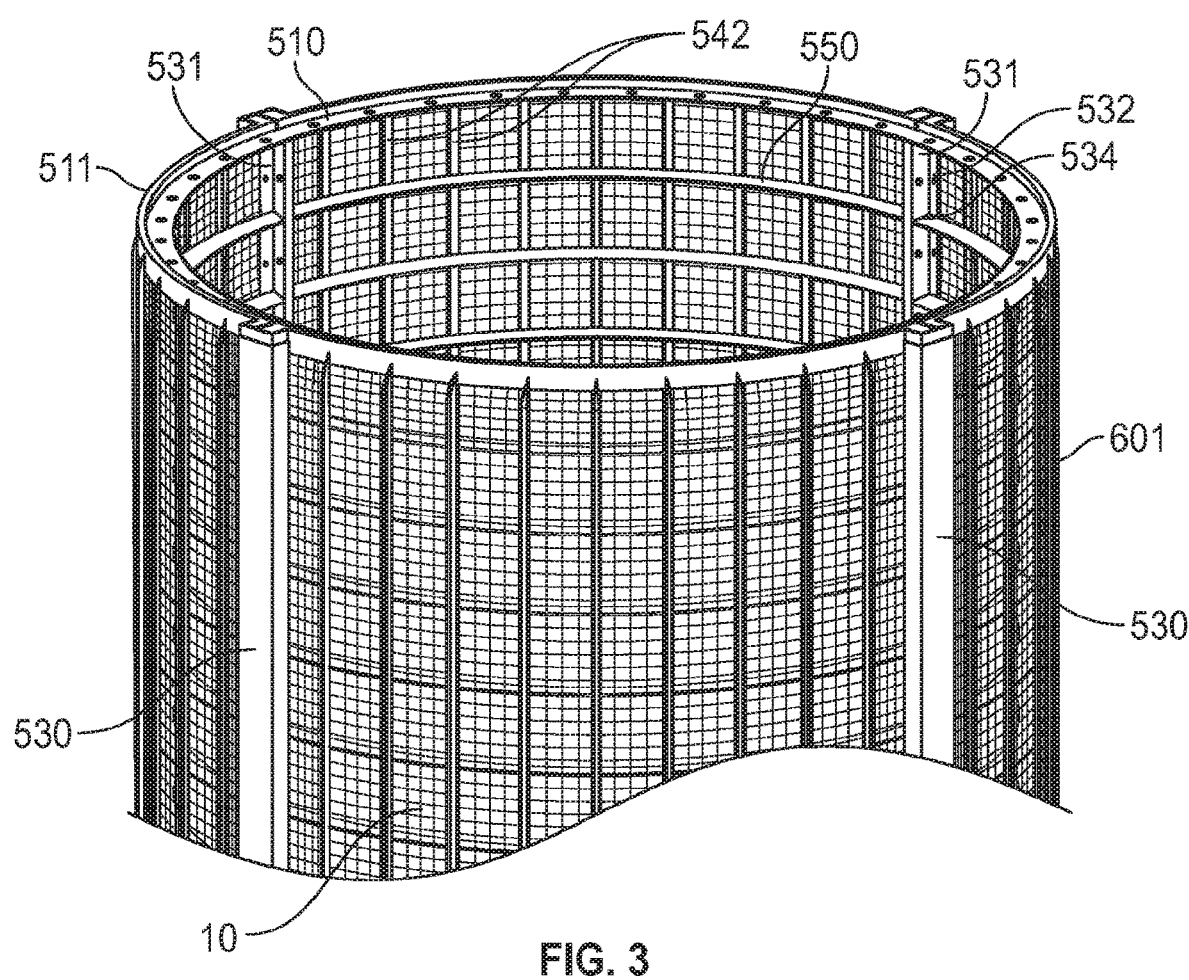
FIG. 3 shows a top-side perspective view of a screen basket, according to an example embodiment of the present disclosure.

As shown in FIG. 3, the support of the basket frame 510 may be formed from a plurality of the vertical support members 530 and a plurality of horizontal support members 550. The embodiment shown in FIG. 3 includes four primary support members 531 spaced along a periphery of the frame 510, along with a plurality of secondary support members 542 spaced between the primary support members 531. Together, the primary and secondary support members 531, 542 join the upper and lower ends 511, 515 of the frame 510 in a spaced arrangement. The horizontal support members 550 may be provided by a plurality of annular rings or curved sections that are joined end-to-end to form a plurality of annular rings in a spaced relationship throughout the basket frame 510.

As shown in FIG. 3, each of the vertical support members 531 may include an interior strut portion 532. The interior strut portion 532 may, in turn, include apertures 534 therethrough. The horizontal support members 550 pass through the apertures 534, thus maintaining the horizontal support members 550 in a stacked and spaced arrangement.

As shown in the top view of FIG. 2, the upper end 511 of the frame 510 is provided with an opening to allow for use in receiving and processing materials within the screen basket 1. The lower end 515 of the frame 510 is provided with a substantially solid or closed bottom 516 for retaining materials in the screen basket 1 during processing. The substantially closed bottom 516 may be provided with a centralized aperture 517 for use in operational arrangements with shafts of processing machines, as discussed in more detail below.

Embodiments of the disclosure may include a high openarea polyurethane screen 600 attached to a periphery of the frame 510, thereby forming a screen basket 1 having an open top, a substantially solid or closed bottom 516, and a polyurethane screen sidewall 601.

Polyurethane screen 600 may be provided in the form of separate, smaller screen members 10, due to potential size constraints in the molding process of the polyurethane screen 600. For example, as in the embodiment shown in FIG. 1, polyurethane screen 600 may feature a plurality of separate screen members 10. Each screen member 10 is attached to the vertical support of the frame 510.

Figure 4:
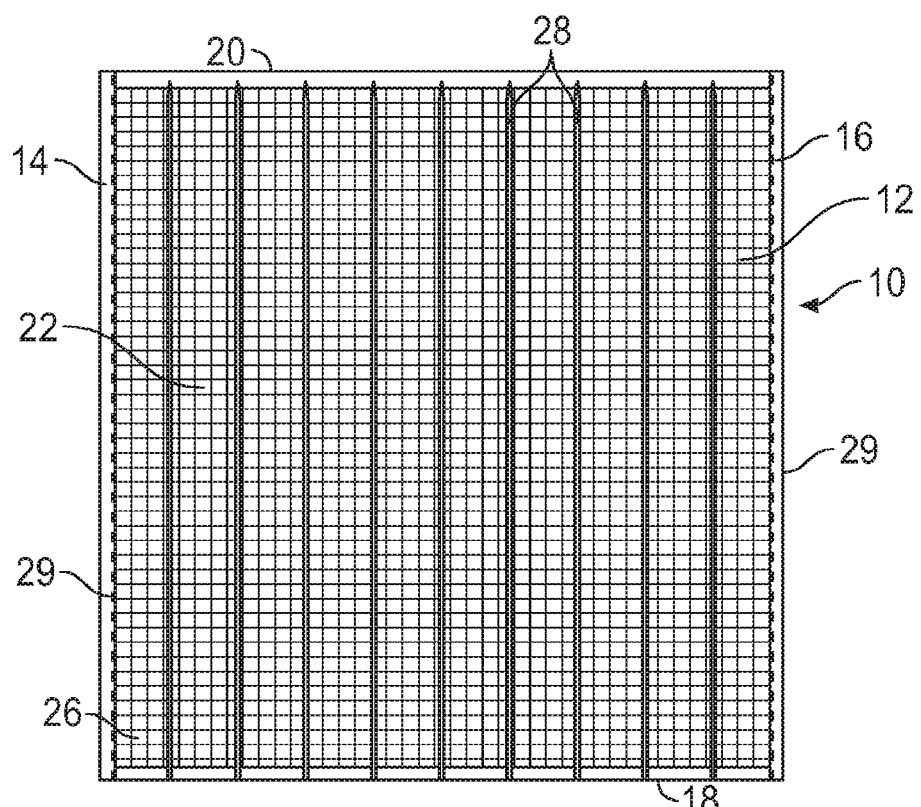
FIG. 4 shows a plan view of a polyurethane screen for use with a basket cage, according to an example embodiment of the present disclosure.
Figure 5:
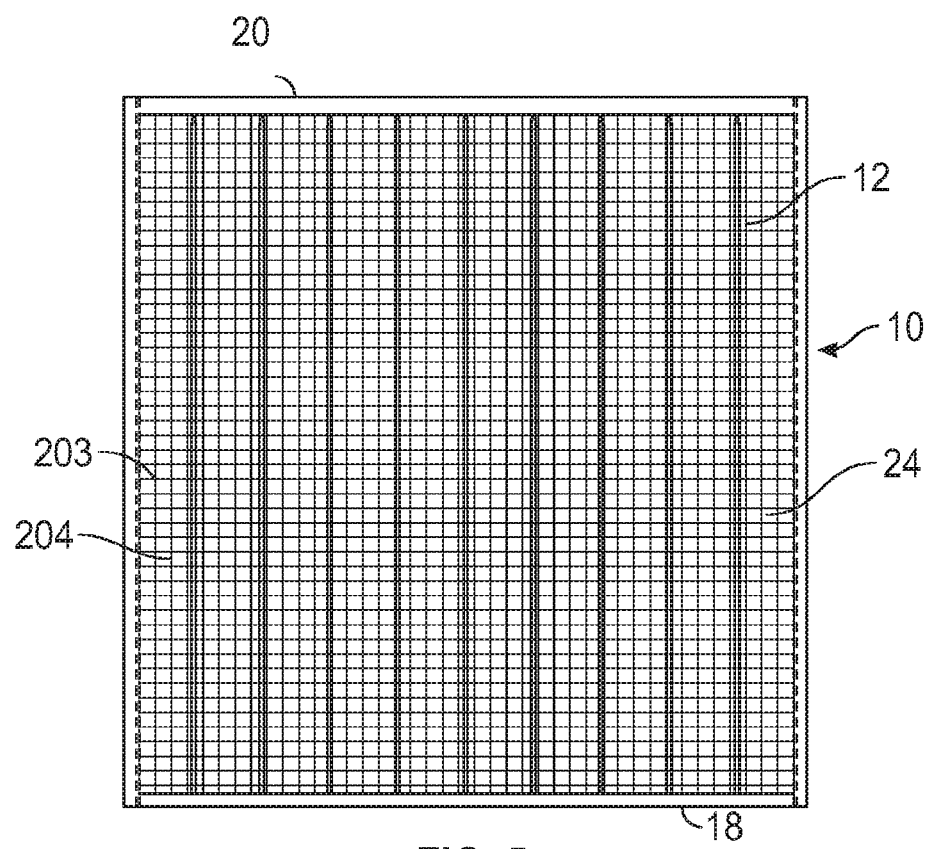
FIG. 5 shows a view of the polyurethane screen of FIG. 4 opposite the plan view of FIG. 4, according to an example embodiment of the present disclosure.
Figure 6:
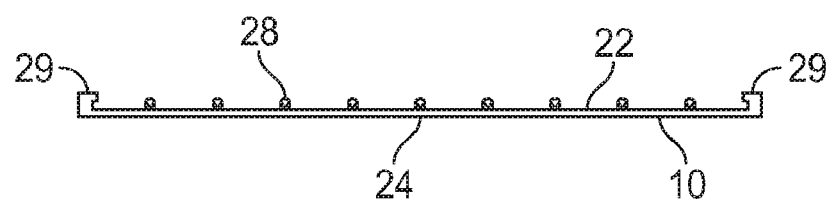
FIG. 6 shows a side view of a polyurethane screen for use with a basket cage, according to an example embodiment of the present disclosure.

FIGS. 4 to 6 show features of an example embodiment of a screen member 10 configured for use in forming the polyurethane screen sidewall 601 of a screen basket 1. FIGS. 4 to 5 show the exterior and interior sides of an embodiment of the screen member 10, respectively, while FIG. 6 shows a side view of an embodiment of the screen member 10. The screen member 10 may comprise polyurethane screens described in more detail in the following patents and patent publications, which share a common assignee with the present disclosure and are incorporated by reference herein: U.S. Pat. Nos. 8,584,866; 9,010,539; 9,375,756; 9,403,192; U.S. Patent Application Publication No. 2015/0197827A1; and U.S. Patent Application Publication No. 2016/0303611A1.

Figure 7:
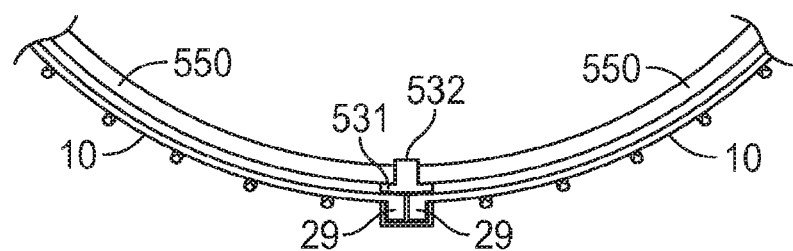
FIG. 7 is a partial top view showing attachment of screen members to a basket frame, according to an example embodiment of the present disclosure.

As shown in FIGS. 4 to 7, an embodiment of the present disclosure may provide for a screen member 10 with a body 12 of molded polyurethane having unperforated side edge portions 14, 16. Side edge portions 14, 16 may each have an integral side ridge portion 29 for use in sealing adjacent screen members 10 to one another and for securing screen members 10 to the basket frame 510, as shown in FIG. 7. Each side edge portion 14, 16 may include a cast-in structural member for use in reinforcing the side ridge portion 29. Side edge portions 14, 16 may also be formed without cast-in structural members or may include other structural members. Side ridge portions 29 may be in any suitable shape for attachment to a basket frame 510. In an exemplary embodiment, side ridge portions 29 may include a formed member, e.g., a metal member that is bent to a desired shape, e.g., a U-shape member, an L-shape member, a C-shape member, or the like. The formed member may be attached to the polyurethane body by heating, pressing, mechanical, chemical, molding, and/or any other suitable method or arrangement.

Body 12 of screen member 10 also includes a lower edge portion 18 and an upper edge portion 20, which, in combination with side edge portions 14, 16, define an outer border of the screen member 10. In certain embodiments, side ridge portion 29 may extend the entire length between upper edge portion 20 and lower edge portion 18.

Body 12 further includes an exterior surface 22 and an interior surface 24. FIG. 4 depicts an exterior surface 22 of the body 12 when screen member 10 is affixed to the basket frame 510, as shown, for example, in FIG. 1, and FIG. 5 depicts an interior surface 24 of the body 12 when screen member is affixed to the basket frame 510 as shown, for example, in FIG. 1. Body 12 includes first members 101 and second members 102 forming screen openings 26, as shown in detail in FIG. 8 and FIG. 8A. First members 101 and second members 102 may, in some embodiments, be configured to include reinforcement members 50, as discussed in more detail below. As shown in the side view of FIG. 6, screen element 10 may further include vertical ribs 28 on the exterior surface 22 of screen element 10. Screen element 10 may, however, not include vertical ribs 28 in certain embodiments of the present disclosure.

Body 12 may further include third members 203 and fourth members 204. Third members 203 and fourth members 204, and vertical ribs 28 if present, may also include reinforcement members 50, discussed in more detail below. Third members 203, fourth members 204, and vertical ribs 28 may, however, not include reinforcement members 50 in certain embodiments of the present disclosure. Third members 203 and fourth members 204 are generally configured to provide support to the screen openings 26 formed by first and second members 101, 102.

Figure 8:
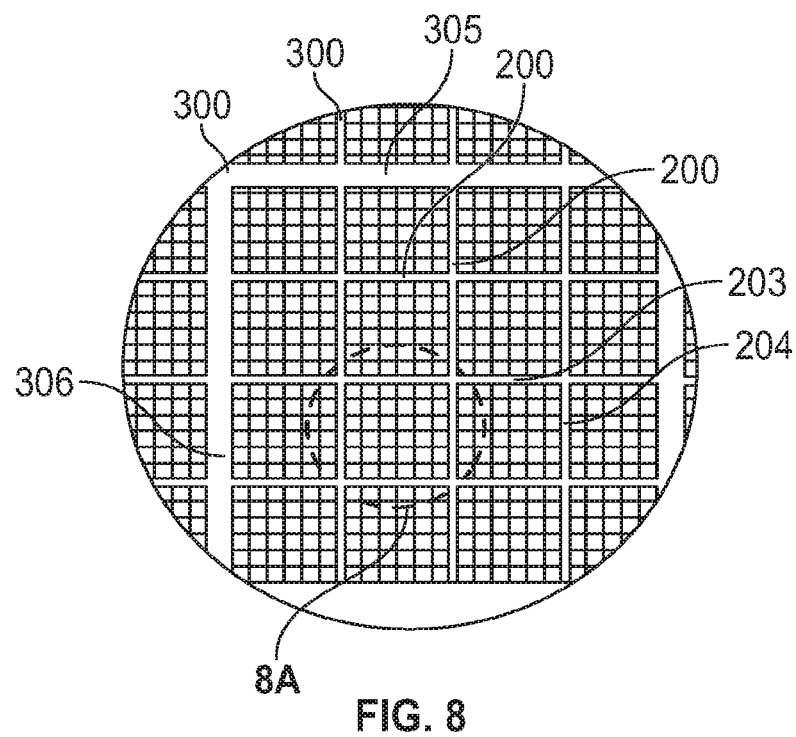
FIG. 8 shows a portion of the polyurethane screen shown in FIG. 4.
Figure 8A:
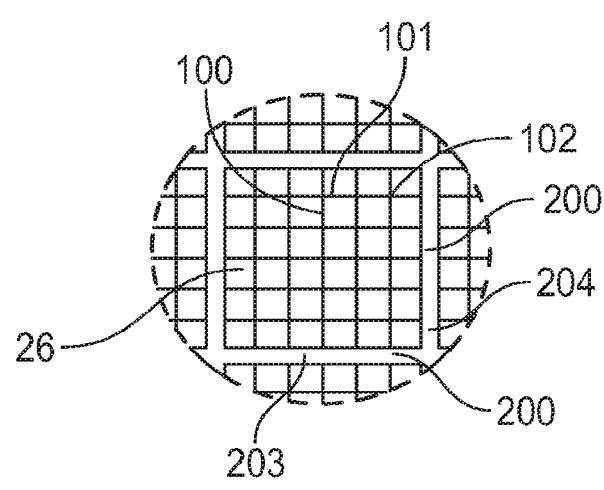
FIG. 8A shows an enlarged view of a portion of the polyurethane screen shown in FIG. 8.

FIG. 8 shows a portion of an embodiment of screen element 10, with FIG. 8A depicting an enlarged view of a portion of FIG. 8. As shown in the detail view of FIG. 8A, first and second members 101, 102 form a first integrally molded grid structure 100 that defines screen openings 26. Third and fourth members 203, 204 may form a second integrally molded grid structure 200, and fifth and sixth members 305 and 306, respectively, may in turn form a third integrally molded grid structure 300.

Reinforcement members 50 may be incorporated into desired members of the screen element 10. Reinforcement members 50 provide stability to screen element 10 by preventing the side edges 14, 16 from deforming and/or hour-glassing. In an exemplary embodiment, reinforcement members 50 may be integrated (such as by molding integrally) with the appropriate members. Reinforcement members 50 may be made of plastic, metal, polymer, or any other suitable material with the necessary structural properties. For example, the reinforcement members 50 may be embodied in rods that are molded integrally with the screen members. The reinforcement members 50 may also be embodied in aramid fibers that are at least one of a twisted multistrand and a woven multistrand, such that the fibers act as wicks to absorb the polyurethane molded around it, thereby providing a strong bond therewith. The twisted or woven multistrand fibers may have a linear density of about 55 denier to about 2840 denier, and may preferably be approximately 1500 denier. When an aramid fiber is used in embodiments of the present disclosure, it may be a set of aramid fibers commercial obtainable under the trademark KEVLAR® of the DuPont Company. Reinforcement members 50 may also be at least one of the aramid fibers commercially obtainable under the commercial names TWARON, SULFRON, TEHINCONEX, and TECHNORA of the Teijin Company. The flexibility of the aramid fibers provides a flexible reinforcement system for the molded polyurethane, which is able to return to its original molded shape after the necessary bending and flexing that occurs during handling and installation. In certain embodiments, reinforcement members 50 may be tensioned before polyurethane is molded around it.

Referring back to the example embodiment shown in FIGS. 4 to 5, and the detail view shown in FIG. 8, grid structures 200 and 300 include bi-directionally integrally molded members forming support grids within the members. Due to the properties of the reinforcement members 50 and the configuration of the bi-directional grid structure, the members may have a relatively small size and thus provide for increased open screening area. The grid structures provide screen strength and support for openings 26 during vibratory loading, and significantly increase open screening area.

As shown in the detail view of FIG. 8A, first members 101 may extend transversely between side edge portions 14, 16, in a manner substantially parallel with each other. Second members 102 may extend transversely between the lower edge portion 18 and the upper edge portion 20, in a manner substantially parallel with each other and substantially perpendicular to first members 101. In certain embodiments, second members 102 may have a thickness greater than that of the first members 101 to provide additional structural support to screen openings 26.

Figure 9:
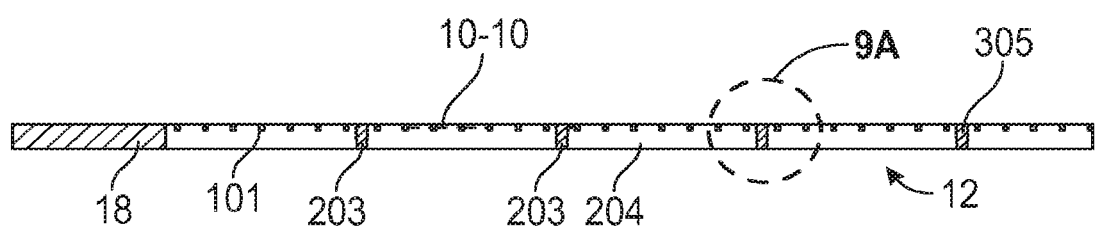
FIG. 9 shows a fragmentary side cross-sectional view of a polyurethane screen, according to an example embodiment of the present disclosure.
Figure 9A:
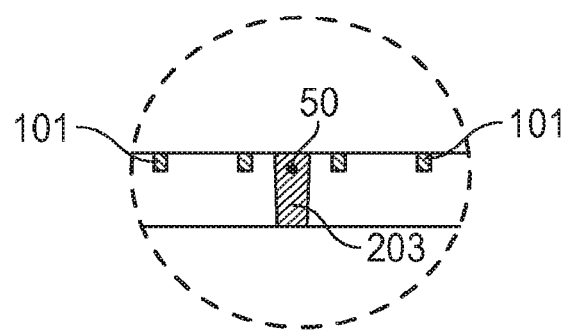
FIG. 9A shows an enlarged view of a portion of the fragmentary cross-sectional view shown in FIG. 9.
Figure 12:
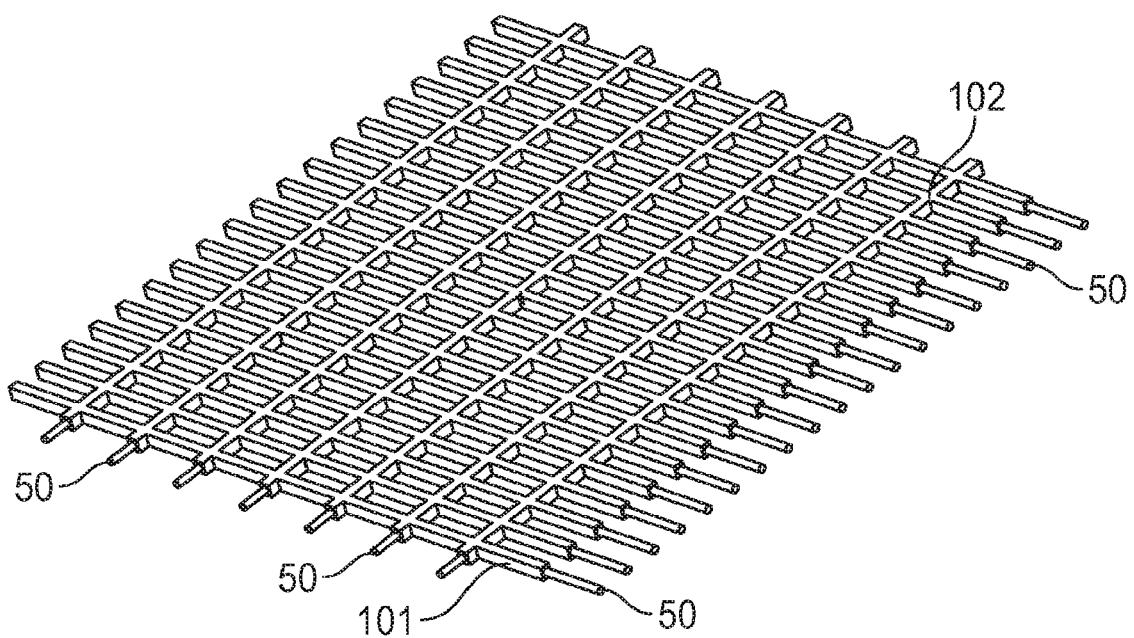
FIG. 12 shows an exploded isometric view of a portion of a polyurethane screen according to an example embodiment of the present disclosure, having reinforcement members integral with the first and second members.

As referred to above, and as shown in the exploded isometric view of FIG. 12, first members 101 and/or second members 102 may include reinforcement members 50, and may or may not be supported by additional support members or support grid structures. For example, as shown in FIG. 9, which depicts a fragmentary cross-sectional view of body 12 of screen member 10, body 12 has first and second members 101, 102 with bi-directional reinforcement members 50 molded integrally therewith. Reinforcement members 50 molded integrally therewith first members 101 have a thickness in the range of about 0.006 inches to about 0.015 inches. Reinforcement members 50 molded integrally therewith second members 102 (not shown) have a thickness in the range of about 0.015 inches to about 0.040 inches. Such configurations may be beneficial for screening applications requiring screens with larger screen openings.

Embodiments of the present disclosure may incorporate reinforcement members 50 in any one of first, second, third, and fourth members 101, 102, 203, 204, as well as ribs 28, and may be incorporated into either all or a portion of the first, second, third, and fourth members 101, 102, 203, 204 and rib members 28.

As shown in FIG. 8 and detail FIG. 8A, screen openings 26 may be elongated, with a greater length dimension along sides and between ends thereof than the width dimensions. Screen openings 26 may be approximately 0.044 mm to about 4.0 mm in width, the width being the dimension between the inner surfaces of adjacent first members 101. Screen openings 26 may be approximately 0.44 mm to about 60 mm in length, the length being the dimension between the inner surfaces of adjacent second members 102. Screen openings 26 may additionally have a variety of different shapes. For example, screen openings 26 may have a rectangular shape, or a square shape, or an ovular shape, or any other shape that may be formed by the first and second members 101, 102. The overall dimensions of screen element 10 may be about 1.2 meters by 1.6 meters, or may be of any other desired size. It may be understood that all dimensions set forth herein are by way of example only, and not of limitation.

Figure 10:
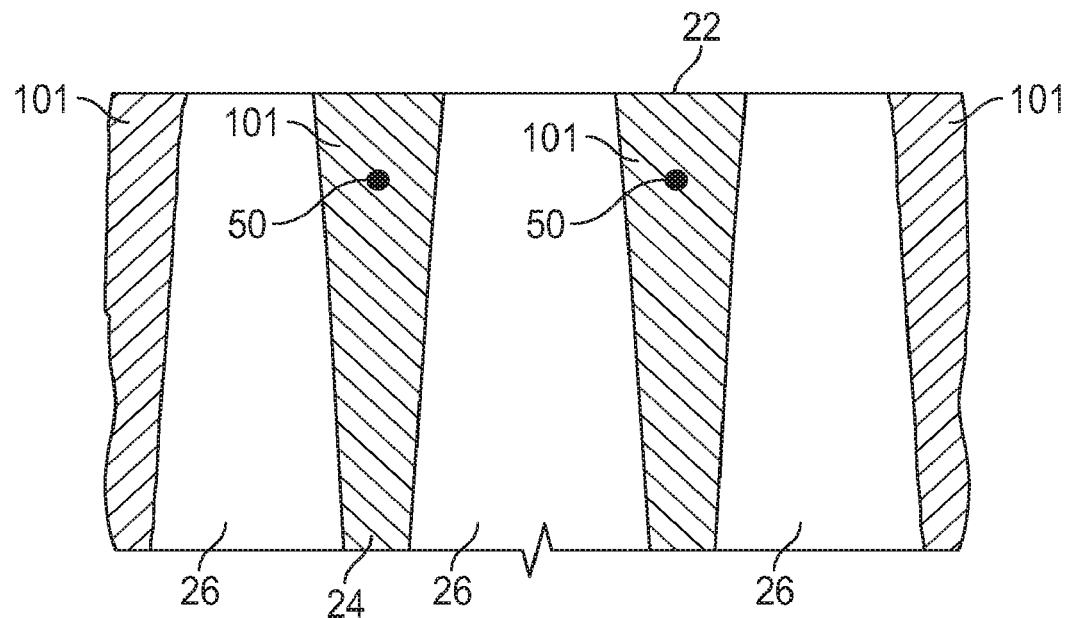
FIG. 10 shows an enlarged fragmentary cross-sectional view taken substantially along line 10-10 of FIG. 9, showing a cross-sectional configuration of a modified shape of the first members with reinforcement members, according to an example embodiment of the present disclosure.
Figure 11:
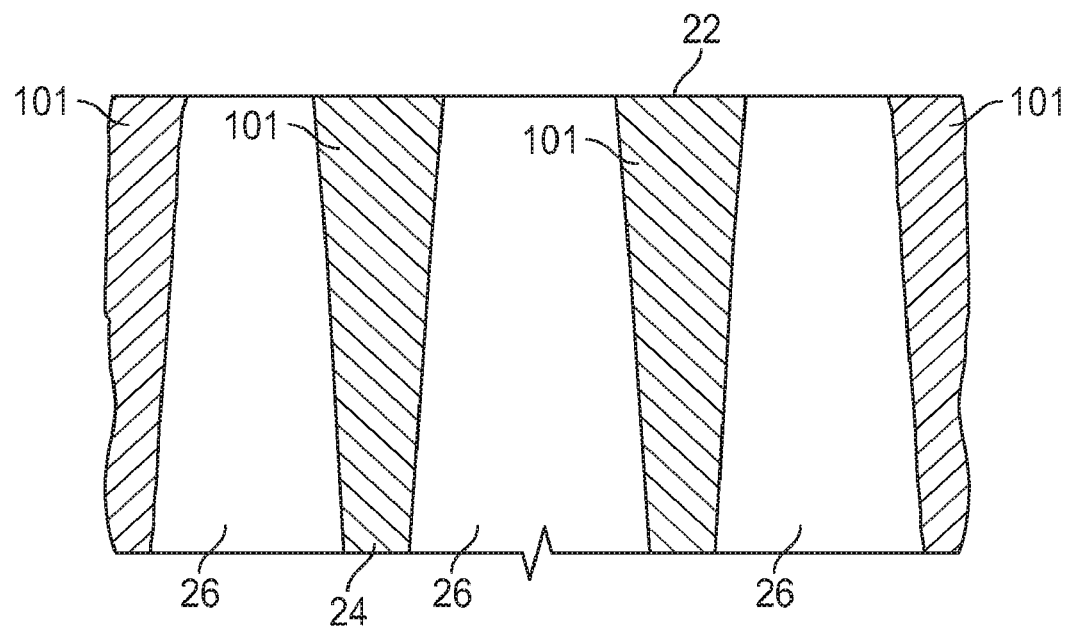
FIG. 11 shows an enlarged fragmentary cross-sectional view similar to that of FIG. 10, but showing first members without reinforcement members, according to an example embodiment of the present disclosure.

Referring briefly to FIG. 10 and FIG. 11, screen openings 26 may diverge downwardly between exterior surface 22 and interior surface 24, with the first members 101 being substantially in the shape of inverted trapezoids. This general trapezoidal shape of first members 101 prevents blinding in screen element 10 and overall polyurethane screen 600. First members 101 may include reinforcement members 50 molded integrally therewith, as shown in FIG. 10, or may optionally not include reinforcement members 50 molded integrally therewith, as shown in FIG. 11.

As illustrated in the detail view of FIG. 8A, third and fourth members 203, 204 may have a thickness greater than first and second members 101, 102. The increased thickness of third and fourth members 203, 204 may provide additional structural support to first and second members 101, 102. As shown in the example embodiment of FIGS. 8 and 8A, third members 203 may extend transversely between the side edge portions 14, 16 in a manner substantially parallel with each other, and may have multiple first members 101 featured therebetween. Fourth members 204 may extend transversely between lower edge portion 18 and upper edge portion 20 in a manner substantially parallel with each other, and may have multiple second members 102 featured therebetween. Reinforcement members 50 may be molded integrally with third and fourth members 203, 204. Third and fourth members 203, 204 may be configured to have a minimal thickness through inclusion of reinforcement members 50, while maintaining the necessary structural support for screen openings 26 formed by first and second members 101, 102 during vibratory screening applications. The bi-directional support system provided by third and fourth members 203, 204 and the added support of reinforcement members 50 integrated therein, where included, greatly reduces the thickness of the support members and provides for increased open screening area and overall screen efficiencies.

Body 12 may further include a plurality of vertical ribs 28. In the embodiment shown in FIGS. 4 to 6, a series of nine ribs 28 may be provided. Ribs 28 may have a thickness greater than that of third and fourth members 203, 204, and may have a portion extending away from the interior surface 24 of body 12. As shown in FIG. 2, ribs 28 may also be provided extending away from the exterior surface 522 of body 12 and thus providing vertical support along the exterior screen sidewall 601. The greater thickness and positioning of ribs 28 provides additional structural support to first and second members 101, 102.

Ribs 28 may extend transversely between the lower edge portion 18 and the upper edge portion 20 in a manner substantially parallel to each other, and may have multiple fourth members 204 therebetween. Ribs 28 may, additionally and in the alternative, extend transversely between the side edge portions 14, 16 in a manner substantially parallel to each other, and may have multiple third members 203 therebetween. Ribs 28 may have reinforcement members 50 molded integrally therein. Ribs 28 may be provided for additional support to screen openings 26, and may be configured to have a minimal thickness through inclusion of reinforcement members 50, while providing the necessary structural support to maintain screen openings 26 during vibratory screening applications. Like third and fourth members 203, 204, provision of a support system of ribs 28 greatly reduces the thickness of the support members and provides for increased open screening area and overall screen efficiencies.

Various configurations of reinforcement members 50 may be provided in the support rib members 28 to add stability to screen member 10. Reinforcement members 50 provided in the support rib members 28 may be an aramid fiber (or individual filaments thereof), a naturally occurring fiber, or other material having relatively large tensile strength with relatively small cross-sectional areas.

Each element of screen element 10 able to incorporate such reinforcement members 50 may include zero, one, or multiple reinforcement members 50, and the reinforcement members 50 used therein may be of different sizes and materials. Reinforcement members 50 may be located in the bottom halves of the members so as not to be exposed relatively early during the life of the screen element 10, as the upper surface of the screen may wear.

The inclusion of the reinforcement members 50, as well as the support framework of the bi-directional support members, allows the first members 101, as well as second members 102, to be relatively thin, creating larger screen openings. Embodiments as described herein have relatively large tensile strengths with relatively small cross-sectional areas. The making of the support members and the thin first members 101 results in the screen member 10 and overall screen 600 having a greater percentage of open area, which, in turn, increases the capacity of the system. Open screening areas according to the embodiments described herein may range, for example, from about 40 percent to about 46 percent of the screen.

According to an embodiment of the present disclosure, a vibratory screen 10 includes a flexible molded polyurethane body 12 having substantially parallel side edge portions 14, 16 at opposite ends of body 12, as well as a lower edge portion 18 substantially perpendicular to the side edge portions 14, 16, and an upper edge portion 20 substantially perpendicular to the side edge portions 14, 16 and opposite the lower edge portion 18. Polyurethane body 12 further includes an exterior surface 22 and interior surface 24. First and second members 101, 102 are provided, forming screening openings 26. The first members 101 extend between the side edge portions 14, 16, and the second members 102 extend between the lower and upper edge portions 18, 20. The body 12 may also include third and fourth members 203, 204, with the third and fourth members 203, 204 having a thickness greater than that of first and second members 101, 102. Third members 203 run substantially parallel to each other and extend transversely between the side edge portions 14, 16, and have multiple first members 101 featured therebetween. Fourth members 204 run substantially parallel to each other and extend transversely between lower and upper edge portions 18, 20, and have multiple second members 102 featured therebetween. Reinforcement members 50 may be molded integrally with the third and/or fourth members 203, 204, and additionally reinforcement members or rods may be molded integrally with fourth members 204. Body 12 also includes ribs 28. Ribs 28 may be substantially parallel to each other and extend transversely between the side edge portions 14, 16. Ribs 28 may also be substantially parallel to each other and extend transversely between the lower and upper edge portions 18, 20. Ribs 28 have a thickness greater than the third and fourth members 203, 204, and may include reinforcement members 50 molded integrally therewith. Body 12 may additionally feature fifth and sixth members 305, 306. Fifth members 305 run substantially parallel to each other and extend transversely between the side edge portions 14, 16, and have multiple third members 203 featured therebetween. Sixth members 306 run substantially parallel to each other and extend transversely between lower and upper edge portions 18, 20, and have multiple fourth members 204 featured therebetween. Reinforcement members 50 may be molded integrally with the fifth and/or sixth members 305, 306, and additionally reinforcement members or rods may be molded integrally with sixth members 306.

Screen members according to this embodiment may have open screening areas greater than 40 percent, and mesh sizes ranging from approximately 0.375 mesh to approximately 400 mesh. By way of example, screens tested having the aforementioned configurations included a 43 mesh size screen, a 140 mesh size screen, and a 210 mesh size screen. Each of these screens had open screening areas ranging from approximately 40 percent to approximately 46 percent. Such large screening areas for such relatively fine mesh sizes are achieved through the relatively strong and thin grid framework created by the third, fourth, fifth, and sixth members 203, 204, 305, 306, and by reinforcement members molded integrally therewith.

In the aforementioned embodiments and examples, the size of each grid unit formed by the intersection of the third and fourth members 203, 204 is approximately 1 inch by 1 inch. Generally, grid units may be larger for screens with larger screen openings and grid units may be smaller for screens with smaller screen openings. This principle may be generally applicable for each example embodiment discussed herein. Grid units may also have a generally rectangular shape, or may have any other suitable shape for supporting the screen openings.

The use of polyurethane screen members 10 as described herein to form a screen sidewall 601 on a basket frame has significant advantages over conventional wedge wire screens. Polyurethane screen members 10 as described herein resist wear, abrasion, bending, and chemicals better than metal, and thus tend to last longer than wedge wire frames in CIL processes. Polyurethane also allows for the formation of significantly smaller screen openings than those of conventional wedge wire frames, which in turn improves screening efficiency. Use of the polyurethane screen members 10 as described herein provides for significantly larger screening areas, and significantly reduces blinding as compared to conventional wedge wire screen baskets.

Figure 13:
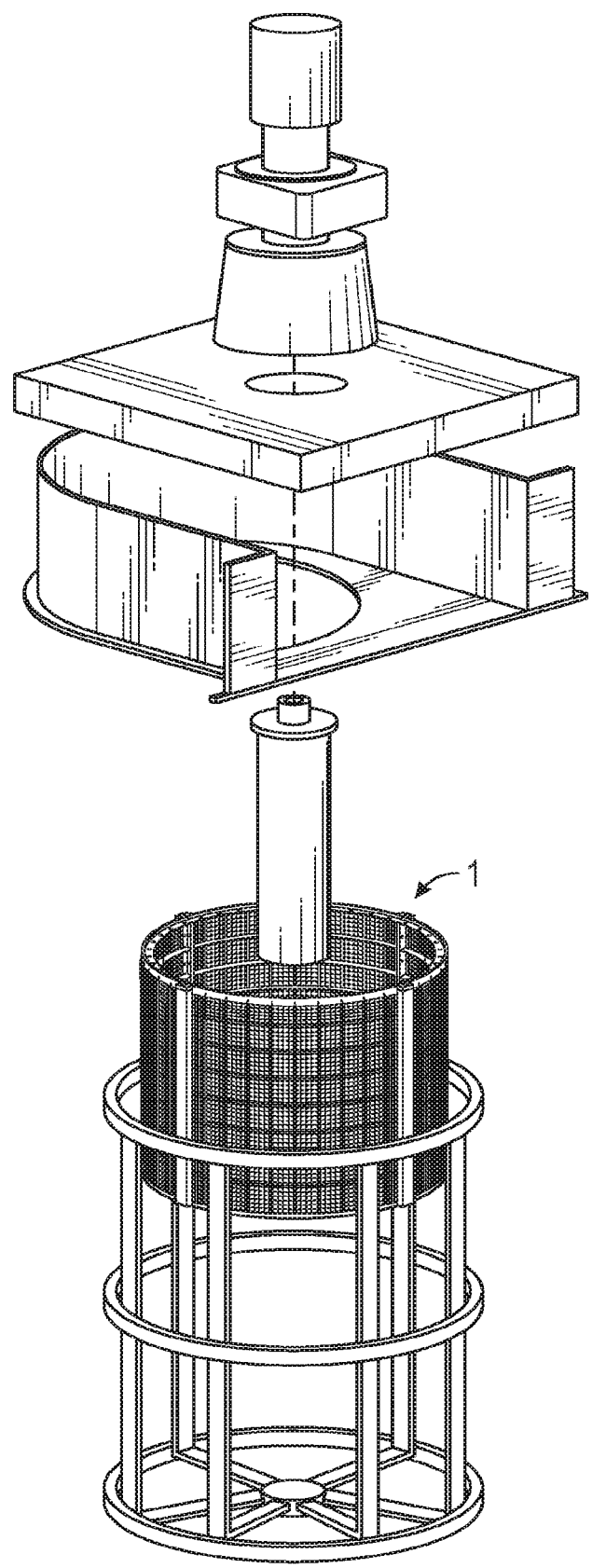
FIG. 13 shows an exploded view of a use of a screen basket according to an example embodiment of the present disclosure, in an embodiment of a screen separator apparatus.
Figure 14:
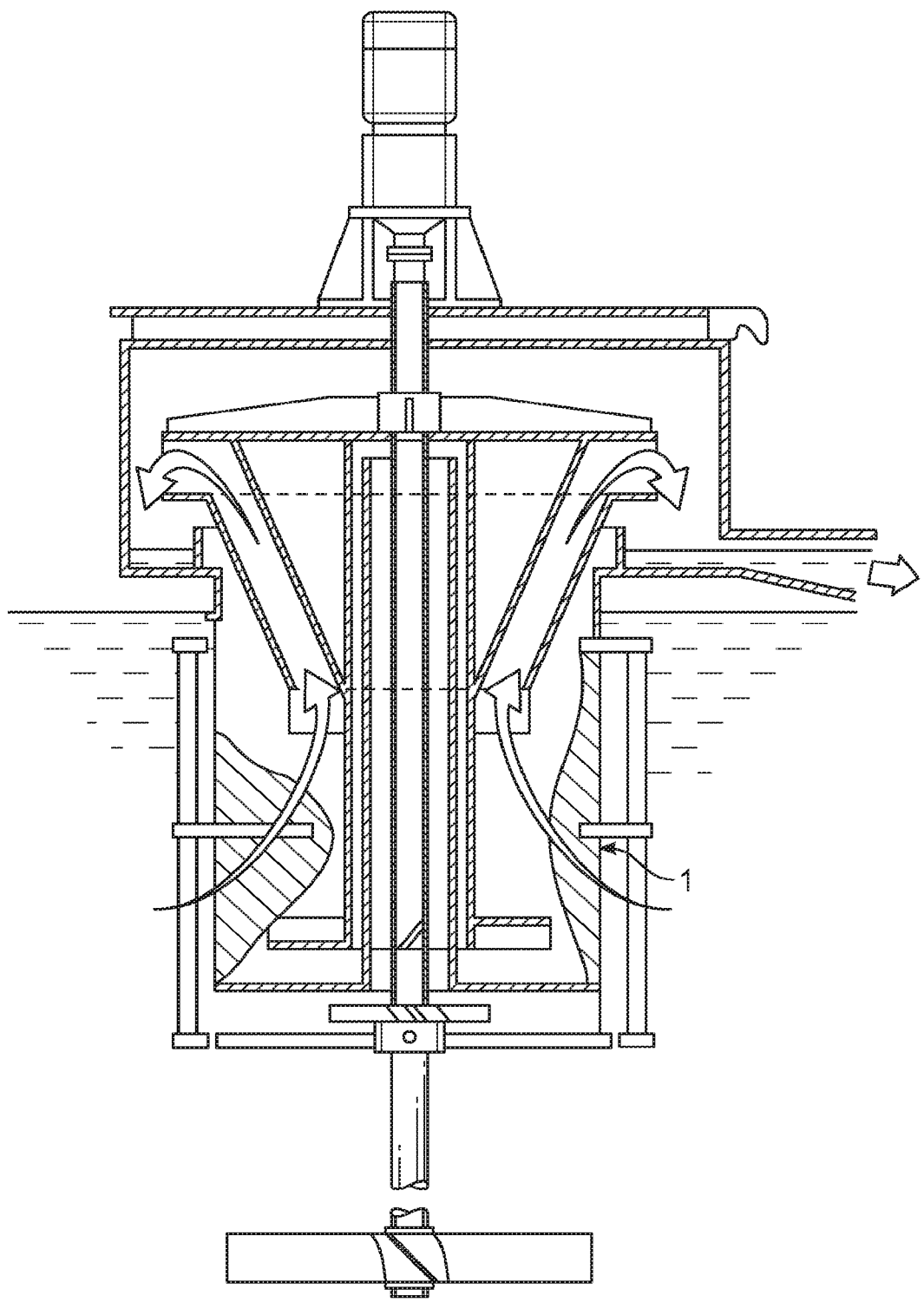
FIG. 14 shows a side cross-sectional view of an example embodiment of use of a screen basket, according to an example embodiment of the present disclosure, in an embodiment of a screen separator apparatus.

In operation, the screen basket 1 described herein may be used with known CIP and CIL devices and processes, such as those described in U.S. Pat. No. 5,238,117. For example, as shown in FIGS. 13 to 14, the screen basket 1 is attached below a volute portion of an NKM vertically swept interstage apparatus. A drive shaft of the NKM apparatus passes from the top to the bottom of the screen basket 1, and through the centralized opening in the closed bottom of the screen basket 1. A gearbox and motor is positioned above the volute to power the drive shaft. A launder interface is situated above the polyurethane screen and volute interface to receive flow of pulp discharge.

With the screen basket 1 attached to the NKM apparatus, the lower portion of the NKM device, including the screen basket 1, is inserted into and suspended over a large adsorption tank containing slurry of pulp to be processed. The level of the pulp in the tank is higher than the level of the fluid in the screen basket 1. This arrangement causes the pulp to naturally flow through the screen of the screen basket 1 in an effort to equalize the fluid levels in the pulp tank and the screen basket 1. Blades on the outside of the NKM unit rotate within the tank around an outer periphery of the screen sidewall of the screen basket 1. The outside blades also assist in preventing particles from clogging the exterior side of the polyurethane screen, such as by carbon and pulp. The pulse and sweeping action reduces the possibility of carbon and near size material blinding the screen openings. Impeller blades located on the inside of the screen, such as on the drive shaft, serve to keep particles in suspension and drive pulp upward toward the volute and launder.

During the process, pulp flows upward through the inside of the screen basket 1. Carbon is retained in the screen. The pulp exists via the launder interface situated above the polyurethane screen and volute interface.

In these processes, it can be seen that the continuous rotation of interior and exterior blades in the vicinity of the polyurethane screen, together with the flow of large volumes of pulp through the openings of the polyurethane screen, subjects the screen to substantial wear and tear. The polyurethane screens and the arrangement of the screen basket described herein are designed to withstand significant wear and tear and to substantially outperform existing wire screen baskets in CIP and CIL processes.

Although the screen basket 1 has been described for use in a CIP or CIL process, the relatively small openings and relatively large screening area of the polyurethane screen members 10 described herein allow the screen basket 1 to be used for other purposes, such as water filtration and desalination.

Figure 15:
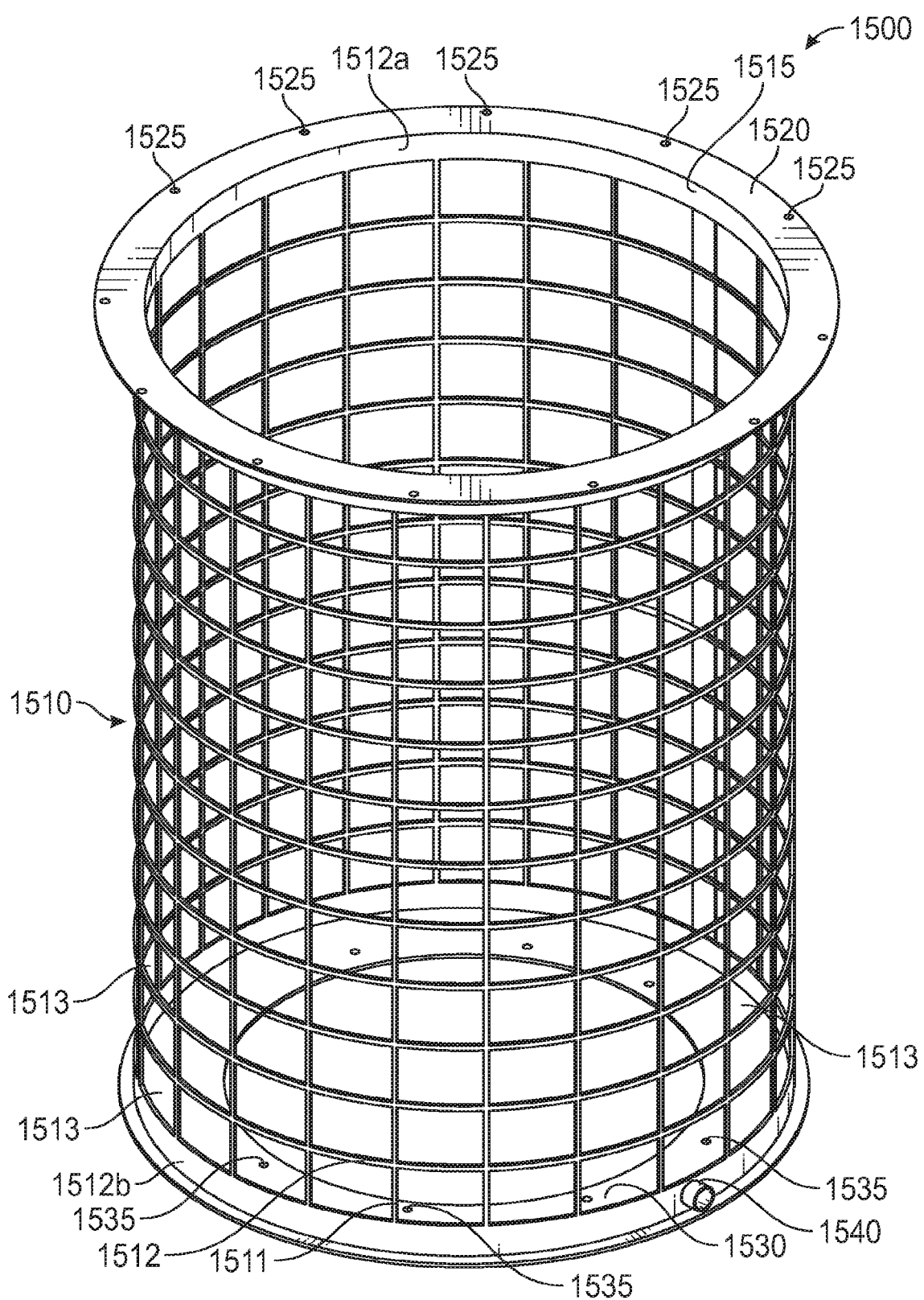
FIG. 15 shows a perspective view of an example of a basket cage in accordance with an example embodiment of the disclosure.

FIG. 15 illustrates a perspective view of an example of a basket cage 1500 in accordance with an additional embodiment of the disclosure. The basket cage 1500 includes a grid frame 1510 that is tubular (or has substantially cylindrical symmetry) with respect to a longitudinal axis and has multiple openings 1513. As such, the grid frame 1510 has a height and a diameter. As an illustration, the height can have a magnitude in a range from about 23 in (about 58 cm) to about 122 in (about 310 cm). As another illustration, the diameter can have a magnitude in a range from about 10 in (about 25.4 cm) to about 73 in (about 185.4 cm). In an example embodiment, the height has a magnitude of about 80 in (about 203.2 cm) and the diameter has a magnitude of about 50 in (about 127 cm). It is noted that the disclosure is not limited to such illustrative magnitudes of height and/or diameter, and other sizes of the grid frame 1510 can be contemplated. Additionally, the grid frame 1510 is not limited to a tubular or cylindrical symmetry, but can be shaped in any configuration suitable for screening, and particularly for carbon retention screening as discussed herein. Grid frame 1510 may also be formed from any material providing sufficient structure for the screening process and sufficient support for the screening cartridges that will be attached to the grid frame 1510. For example, grid frame 1510 may be formed of a metal or metallic alloy, such as stainless steel, or may be a thermoplastic material sufficient to support the screening cartridges. In embodiments featuring a thermoplastic grid frame 1510, the grid frame 1510 may comprise a single injection-molded piece. In other embodiments, the grid frame 1510 may be formed of separable pieces connected together to form the grid frame 1510.

In certain embodiments, the grid frame 1510 can be formed in the desired shape by bending a perforated sheet onto itself, around the longitudinal axis, and joining opposing edges of the perforated sheet. The joined opposing edges can form a longitudinal seam 1515. In some embodiments, the perforated sheet can be formed from a metal or metallic alloy (e.g., stainless steel), and the opposing edges can be joined by welding. In other embodiments, the perforated sheet can be formed from a rigid plastic, and the opposing edges can be joined by laser welding and/or gluing with a suitable adhesive. The multiple openings 1513 in the grid frame 1510 can be arranged in a square lattice, and each one (or, in some embodiments, at least some) of the multiple openings 1513 can have a square shape. Multiple openings 1513 may have shapes other than a square shape, such as a rectangular shape, an ovular shape, a circular shape, and so forth. Moreover, multiple openings 1513 are not required to have a consistent shape throughout the grid frame 1510. For example, some embodiments may feature alternating rectangular openings of varying sizes to form the overall grid frame 1510. In an example embodiment, the multiple openings 1513 can include 264 square openings. A subset of the multiple openings can be defined by longitudinal members 1511 and transversal members 1512. Openings in such a subset may be referred to as inner openings. A second subset of the multiple openings can be defined by longitudinal members 1511 and transversal segments of a first annular section 1512*a* of the grid frame 1510. Similarly, a third subset of the multiple openings can be defined by longitudinal members 1511 and transversal segments of a second annular section 1512*b* of the grid frame 1510. The second subset and the third subset of openings can be referred to as outer openings.

The first annular section 1512*a* and the second annular section 1512*b* can embody or otherwise can constitute respective opposing end portions of the grid frame 1510, along the longitudinal axis. A flange 1520 can be affixed or otherwise attached to an end of the first annular section 1512*a*. The flange 1520 can include multiple first openings 1525. The flange 1520 and first openings 1525 can permit or otherwise facilitate mounting a plate or another type of cover on the flange 1520. In addition or in other embodiments, the flange 1520 and first openings 1525 can permit or otherwise facilitate mounting the basket cage 1500 into a screen separator machine (e.g., an NKM vertically swept interstage apparatus, as shown in FIG. 13 and FIG. 14). In addition, a second flange 1530 can be affixed or otherwise attached to the second annular section 1512*b*. The second flange 1530 can include multiple second openings 1535. The flange 1530 and second openings 1535 can permit or otherwise facilitate mounting the basket cage 1500 into a screen separator machine (e.g., an NKM vertically swept interstage apparatus, as shown in FIG. 13 and FIG. 14), and/or affixing an exterior wiper assembly of the screen separator machine (not shown).

As is illustrated in FIG. 15, the basket cage 1500 can also include an opening in a vicinity of the second end of the grid frame 1510, near the second flange 1530. A pipe member 1540 can be assembled on the vicinity of the opening. The opening and the pipe member 1540 can form an outlet that can permit or otherwise facilitate the egress of a slurry from the interior of the basket cage 1500 when it needs to be drained upon removal.

Figure 16A:
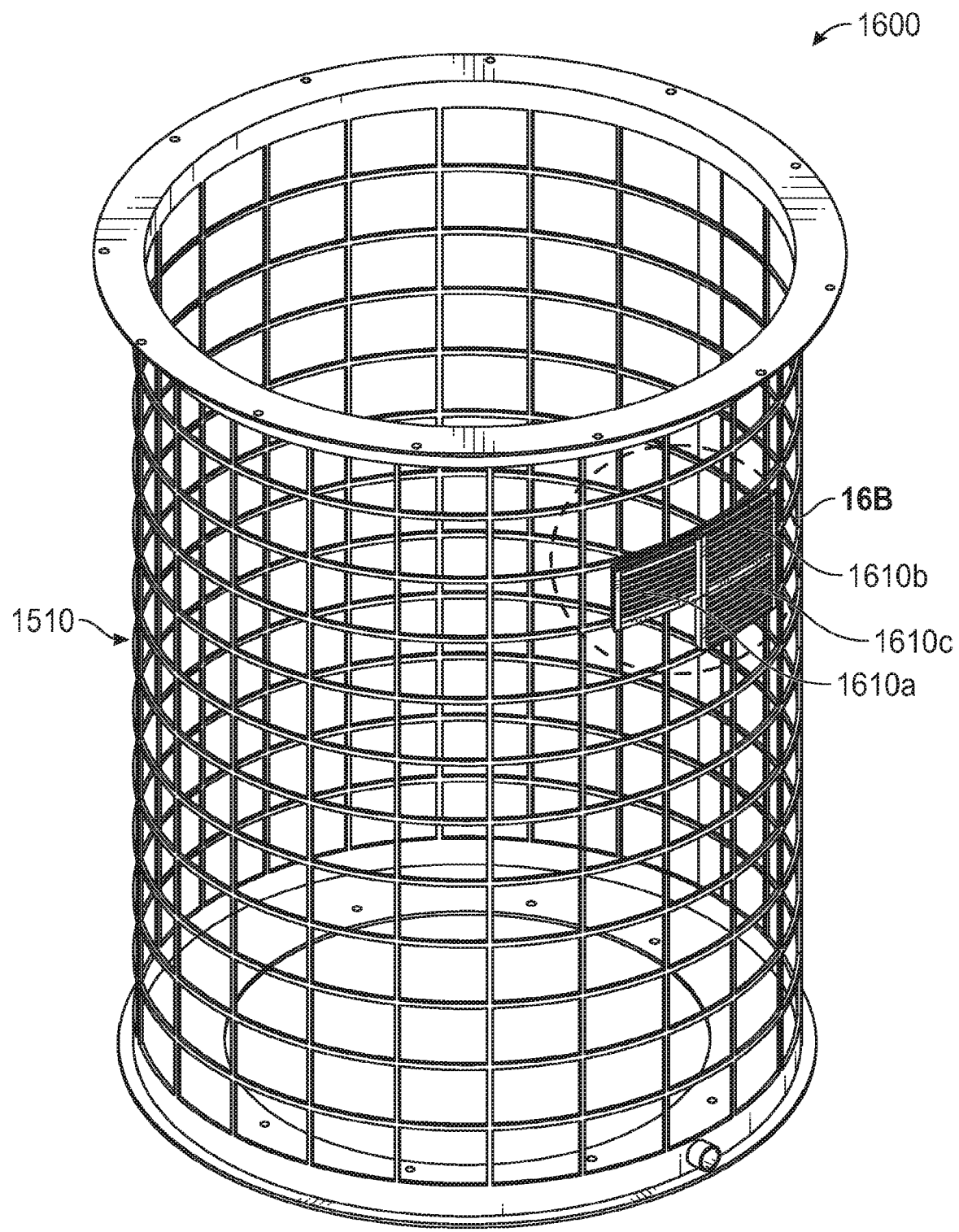
FIG. 16A shows a perspective view of an example screen basket that includes multiple screening cartridge assemblies attached to a basket cage, according to an example embodiment of the present disclosure.

Similar to other screen baskets of this disclosure, the basket cage 1500 in combination with screening elements can be utilized in a separation process to separate specific particulate matter from slurry or another type of fluid source. To that end, in one embodiment, screening cartridge assemblies can be mounted to the basket cage 1500, where the screening cartridge assemblies can permit or otherwise facilitate the separation of specific particulate matter from the slurry. Specifically, as an illustration, FIG. 16A presents a perspective view of an example of a screen basket 1600 that includes multiple screening cartridge assemblies 1610 in accordance with one or more embodiments of the disclosure. The multiple screening cartridge assemblies include a first screening cartridge assembly 1610*a*, a second screening cartridge assembly 1610*b*, and a third screening cartridge assembly 1610*c*. Each one of the screening cartridge assemblies 1610*a*, 1610*b*, 1610*c* can be mounted or otherwise affixed to a respective group of grid members that define, at least in part, a respective opening of the grid frame 1510. Screening cartridge assemblies 1610 may be removable, such that screening cartridge assemblies may be mounted to basket cage 1500 and subsequently removed easily from basket cage 1500 for maintenance or repair, or may be permanently affixed to basket cage 1500. For openings in a row about the longitudinal axis of the grid frame 1510, a group of grid members that support a first one of the screening cartridge assembles 1610*a* and 1610*b* can have a common grid member with another group of grid members that support a second one of the screening cartridge assemblies 1610*a* and 1610*b*. More specifically, in one example, the first screening cartridge assembly 1610*a* can grip or otherwise attach to a first longitudinal member and a second longitudinal member of the grid frame 1510. In addition, the second screening unit 1610*b* can grip or otherwise attach to the second longitudinal member and a third longitudinal member.

In some embodiments, each one of the multiple screening cartridge assemblies mounted or affixed to the grid frame 1510 includes a screening assembly and a case (or another type of container) configured to receive and hold the screen assembly. In some embodiments, the case can be embodied in a single injection molded piece integrally formed by means of injection molding a polyurethane, a thermoset polymer, or other types of polymers. Example embodiments of the injection molded piece and the process of forming the injection molded piece are discussed in more detail in the disclosures of U.S. patent application Ser. No. 13/800,826, U.S. Pat. Nos. 9,409,209, 9,884,344, U.S. patent application Ser. No. 15/851,009, U.S. patent application Ser. No. 15/965,195, and the cross-references included therein, which are hereby incorporated by reference herein in their entireties. The case and screening assembly held therein may be of any shape and structure suitable for mounting to the grid frame. In some embodiments, the case and screening assembly may be substantially rectangular. In other embodiments, the case and screening assembly may have a square shape, or may be of an ovular shape, or may have a triangular shape, or so forth.

Figure 16B:
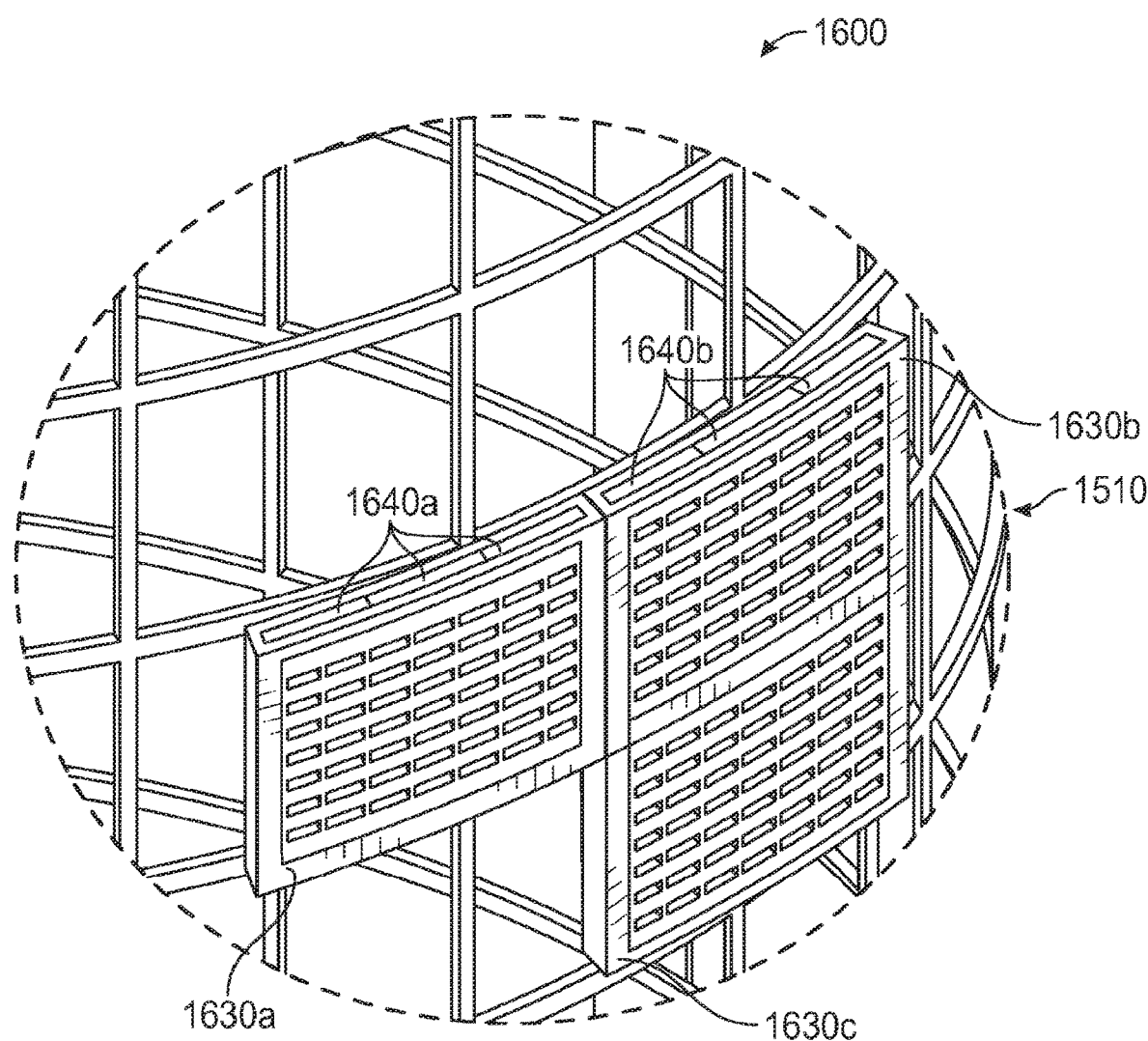
FIG. 16B shows a fragmentary perspective view of the screen basket shown in FIG. 16A, featuring multiple screening cartridge assemblies, according to an example embodiment of the present disclosure.

As is illustrated in FIG. 16B, screening cartridge assembly 1610*a* includes a case 1630*a* and a screen assembly having three screen units 1640*a*. It is noted that the disclosure is not limited to three screen units and, in some embodiments, less or additional screen units can be implemented. For a defined size of a screen unit, a larger number of screen units results in a case 1630*a* with larger dimensions, thus resulting in a larger screening cartridge assembly. Larger screening cartridge assemblies may be utilized in grid frames having larger grid openings.

Figure 16C:
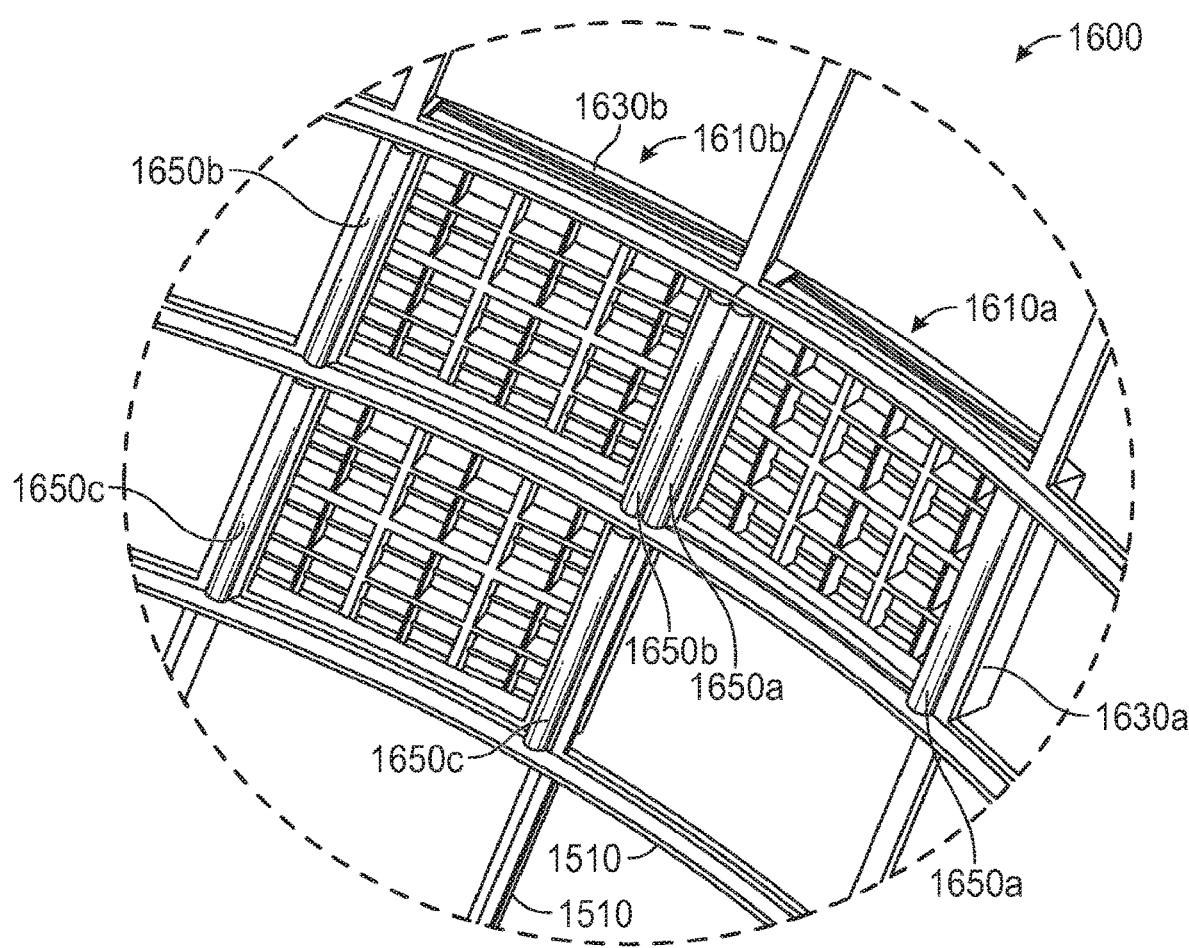
FIG. 16C shows a fragmentary perspective view of an interior portion of the screen basket shown in FIG. 16A, featuring the multiple screening cartridge assemblies, according to an example embodiment of the present disclosure.

The case 1630*a* includes a first opening configured to receive and/or fit the screen assembly within the case 1630*a*. The case 1630*a* also includes a second opening that permits exposing a screening surface of the screen assembly to an exterior of the grid frame 1510. The screening surface can be embodied in or can include, for example, a substantially seamless and planar surface including multiple screening openings having, for example, a substantially uniform size and/or substantially uniform shape. The multiple screening openings can have rectangular shape, square shape, circular shape, a combination thereof, or the like. In addition, as is illustrated in FIG. 16C, the case 1630 also includes ridges 1650*a* that extend from a first edge of the case 1630*a*, near the first opening, to an opposing second edge of the case 1630*a*. The ridges 1650*a* and respective portions of the case 1630*a* form respective recesses that permit or otherwise facilitate mounting (e.g., gripping or clipping) the case 1630*a* to the grid frame 1510. Case 1630*a* may be permanently mounted to the grid frame 1510 by use of the ridges 1650*a* and respective portions of the case 1630*a*, or may be removably mounted to the grid frame 1510, such that the case 1630*a* may be removed as required for maintenance or repair.

Similarly, screening cartridge assembly 1610*b* includes a case 1630*b* and a screen assembly having three screen units 1640*b*. As mentioned, the disclosure is not limited to three screen units and, in some embodiments, less or additional screen units can be implemented. The case 1630*b* also includes a first opening configured to receive and/or fit the screen assembly within the case 1630*b*. The case 1630*b* also includes a second opening that permits exposing a screening surface of the screen assembly to an exterior of the grid frame 1510. The screening surface can be embodied in or can include, for example, a substantially seamless and planar surface including multiple screening openings having, for example, a substantially uniform size and/or substantially uniform shape. In addition, as is illustrated in FIG. 16C, the case 1630*b* further includes ridges 1650*b* that extend from a first edge of the case 1630*b*, near the first openings, to an opposing second edge of the case 1630*b*. The ridges 1650*b* and respective portions of the case 1630*b* can form respective recesses that permit or otherwise facilitate mounting (e.g., gripping or clipping) the case 1630*b* to the grid frame 1510. In regards to the screen assembly contained in the case 1630*b*, as is further illustrated in FIG. 16C and FIG. 17, each one of the screen units 1640*b* includes a framework unit having one or more screen elements affixed to a surface of the framework unit, and the screen units 1640*b* can be mechanically joined or otherwise secured together to form the screen assembly. To that end, each one of the screen units 1640, such as is illustrated with reference to 1640*b*, can include one or more fasteners that can permit or otherwise facilitate fastening a first one of the screen units (e.g., screen unit 1640*a*) to a second one of the screen units (e.g., 1640*b*). Regardless of the mechanism for adjoining the screen units 1640*b*, the respective screen elements of the screen units 1640 can form the screening surface that can be exposed to slurry in the exterior of the grid frame 1510.

In some embodiments, each one (or, in other embodiments, at least one) of the screen elements can be embodied in a single injection molded piece integrally formed by means of injection molding of a thermoplastic material. Example thermoplastic materials and the processes of creating the example thermoplastic materials used as the screen elements in the present disclosure are discussed in detail in the disclosures of U.S. patent application Ser. No. 13/800, 826, U.S. Pat. Nos. 9,409,209, 9,884,344, U.S. patent application Ser. No. 15/851,009, U.S. patent application Ser. No. 15/965,195, and the cross-references included therein, which are incorporated by reference herein in their entireties.

Figure 17:
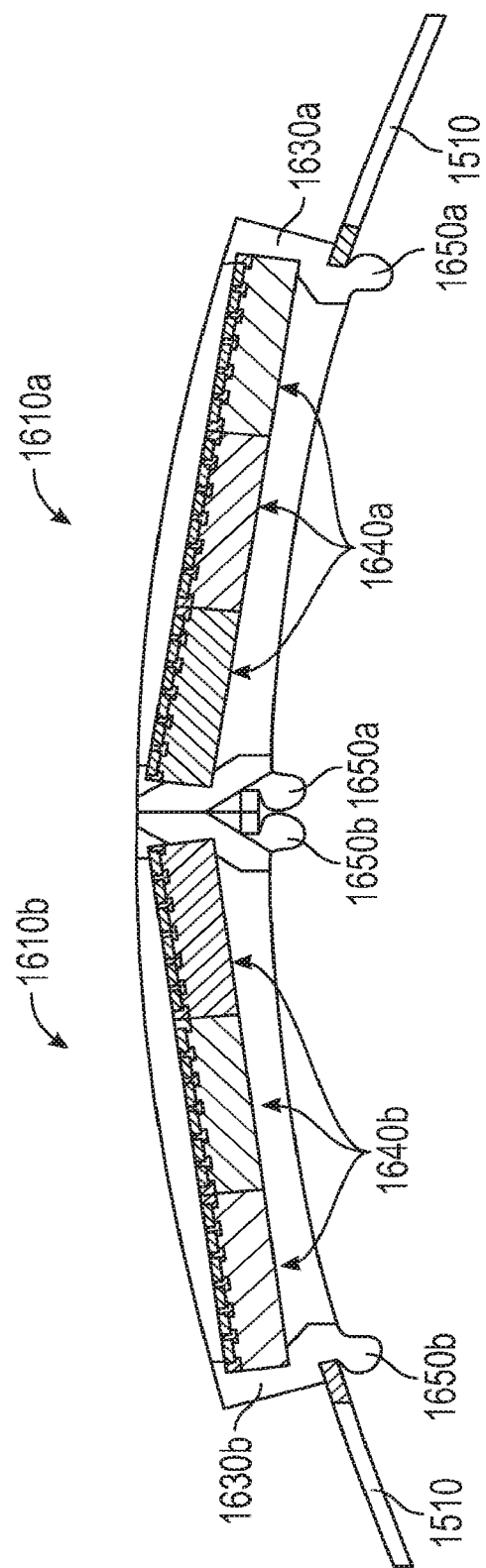
FIG. 17 shows a fragmentary cross-sectional view of example screening cartridge assemblies mounted on a grid frame, according to an example embodiment of the present disclosure.

Screening cartridge assembly 1610*c*, like screening cartridge assemblies 1610*a*, 1610*b*, also includes a case 1630*c* and screen assembly having three screen units (not depicted in FIG. 16B). As mentioned, the disclosure is not limited to three screen units and, in some embodiments, less or additional screen units can be implemented. The case 1630c also includes a first opening configured to receive and/or fit the screen assembly within the case 1630c. The case 1630c also includes a second opening that permits or otherwise facilitates exposing a screening surface of the screen assembly to an exterior of the grid frame 1510. The screening surface can be embodied in or can include, for example, a substantially seamless and planar surface including multiple screening openings having, for example, a substantially uniform size and/or substantially uniform shape. In addition, as is illustrated in FIG. 16C, the case 1630c further includes ridges 1650c that extend from a first edge of the case 1630c, near the first opening, to an opposing second edge of the case 1630c. The ridges 1650c and respective portions of the case 1630c form respective recesses that permit or otherwise facilitate mounting (e.g., gripping or clipping) the case 1630c to the grid frame 1510. FIG. 17 illustrates the mechanical coupling of the screening cartridge assembly 1610a and the screening cartridge assembly 1610b to transversal grid members of the grid frame 1510. As mentioned, ridges 1650a permit or otherwise facilitate mounting the screening cartridge assembly 1610a to the grid frame 1510. Likewise, ridges 1650b permit or otherwise facilitate mounting the screening cartridge assembly 1610b to the grid frame 1510.

The screening cartridge assembly 1610a and the screening cartridge assembly 1610b include respective screen assemblies. The screen assembly contained in the cartridge assembly 1610a includes three screen units 1640a in accordance with embodiments described herein. The other screen assembly contained in the cartridge assembly 1610b also includes three screen units in accordance with embodiments described herein. As mentioned, the disclosure is not limited to screen assemblies having three screen units and, in some embodiments, less or additional screen units can be implemented. Screen assemblies having different number of screen units also can be implemented.

In connection with the screen assembly contained in the case 1630c, as is further illustrated in FIG. 16C, each one of the screen units that constitutes the screen assembly includes a framework unit having a screen element affixed to a surface of the framework unit. The screen units can be mechanically joined or otherwise secured together to form the screen assembly. To that end, in an embodiment, each one of the screen units can include one or more fasteners that can permit or otherwise facilitate fastening a first one of the screen units to a second one of the screen units. Regardless of the mechanism for adjoining the screen units, the respective screen elements of the screen units 1640 can form the screening surface that can be exposed to the exterior of the grid frame 1510.

It is noted that while three screening cartridge assemblies are illustrated in FIGS. 16A to 16C and FIG. 17, the entirety or substantially the entirety of the grid frame 1510 of the screen basket 1600 can be covered for operation in a separation process. As such, in an example embodiment, 264 screening cartridge assemblies can be mounted to the respective 264 square openings 1513 in an embodiment of grid frame 1510.

Figure 18A:
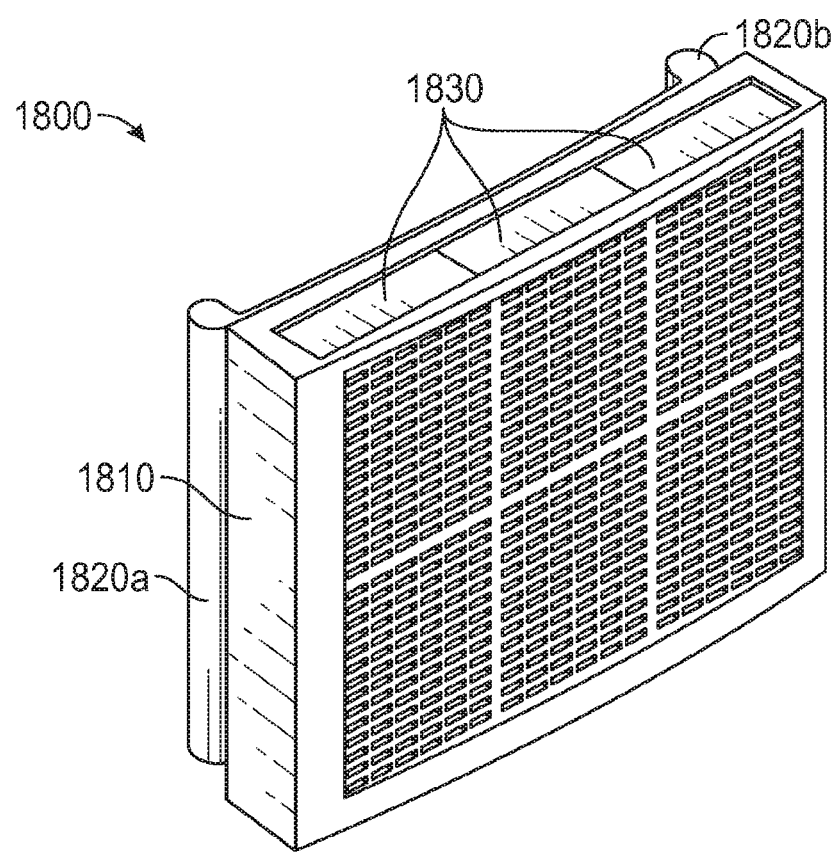
FIG. 18A shows a perspective view of an example of a screening cartridge assembly, according to an example embodiment of the present disclosure.

FIG. 18A illustrates a perspective view of an example of a screening cartridge assembly 1800, in accordance with one or more embodiments of the present disclosure. The exemplified screening cartridge assembly 1800 includes a case 1810 and a screen assembly having three screen units 1830. As mentioned, the disclosure is not limited to three screen units and, in some embodiments, less or additional screen units can be implemented. The case 1810 has a generally arcuate shape, and includes a first opening configured to receive and/or fit the screen assembly within the case 1810. The case also includes a first ridge 1820a and a second ridge 1820b. Each one of the ridge 1820a and the ridge 1820b extends from a vicinity of a first, top edge of the case 1810 to a vicinity of an opposing second, bottom edge of the case 1810. In use, the arcuate shape of case 1810 allow for a substantially consistent distance between the external propulsion blades of the screening apparatus and the screening cartridge assembly, thereby reducing clogging and elongating the life of the screen elements.

Similar to other screening cartridge assemblies of this disclosure, as is illustrated in the top cross-sectional view 1850 of screening cartridge assembly 1800 shown in FIG. 18B, each one of the screen units 1830 can include two end framework units 1855 and a single medial framework unit 1857, each of the two end framework units 1855 and the single medial framework unit 1857 having a screen element 1860 affixed to a respective surface of the framework units.

The screen units 1830 can be mechanically joined or otherwise secured together to form the screen assembly. To that end, in an embodiment, each one of the screen units 1830 can include one or more fasteners that can permit or otherwise facilitate fastening a first one of the screen units 1830 to a second one of the screen units 1830. Regardless of the mechanism for adjoining the screen units, the respective screen elements of the screen units 1830 can form a screening surface of the screening cartridge assembly 1800. The case 1810 also includes an opening that permits exposing at least a portion of the screening surface, as is shown in the side view 1890 of screening cartridge assembly 1800 in FIG. 18B.

As is illustrated in the cross-sectional views 1850 and 1870 shown in FIG. 18B, the case 1810 can include an attachment frame section 1852 and a holder frame section 1854. The attachment frame section 1852 and the holder frame section 1854 are also illustrated in the perspective view of the case 1810 shown in FIG. 19A. The holder frame section 1854 can receive and/or hold the screen assembly formed by screen units 1830. To that end, in some embodiments, the holder frame section 1854 includes an opening 1910, and internal sidewalls including sidewall 1920, sidewall 1930, and sidewall 1940. Other internal sidewalls are not visible in the perspective view of FIG. 19A. For instance, as is shown in the cross-sectional view 1950 of case 1810 shown in FIG. 19B, a sidewall 1960 opposite the sidewall 1920 and a sidewall 1980 opposite the sidewall 1930 also are included in the internal sidewalls of the holder frame section 1854. The sidewall 1920, in connection with sidewalls 1930 and 1980, can define a first opening, and the opposing sidewall 1960, in connection with sidewalls 1930 and 1980, can define a second opening. The second opening can have a cross-sectional area greater than the cross-sectional area of the first opening in order to mitigate undesired reduction of screening area. The smaller cross-section can provide greater mechanical stability for a screen assembly arranged within the case 1810. The first opening and the second opening can permit the flow of particulate matter from the exterior to the interior of a screening cartridge assembly including the case 1810. The particulate matter can be screened or otherwise separated by such a screen assembly. Specifically, the particulate matter can be separated from slurry external to a screen basket apparatus having a screening cartridge assembly including the screen assembly, and can flow to an internal region of the screen basket apparatus as intended or required for the screening application (e.g., CIL process, CIP process, ore treatment, water desalinization, or the like).

Figure 19A:
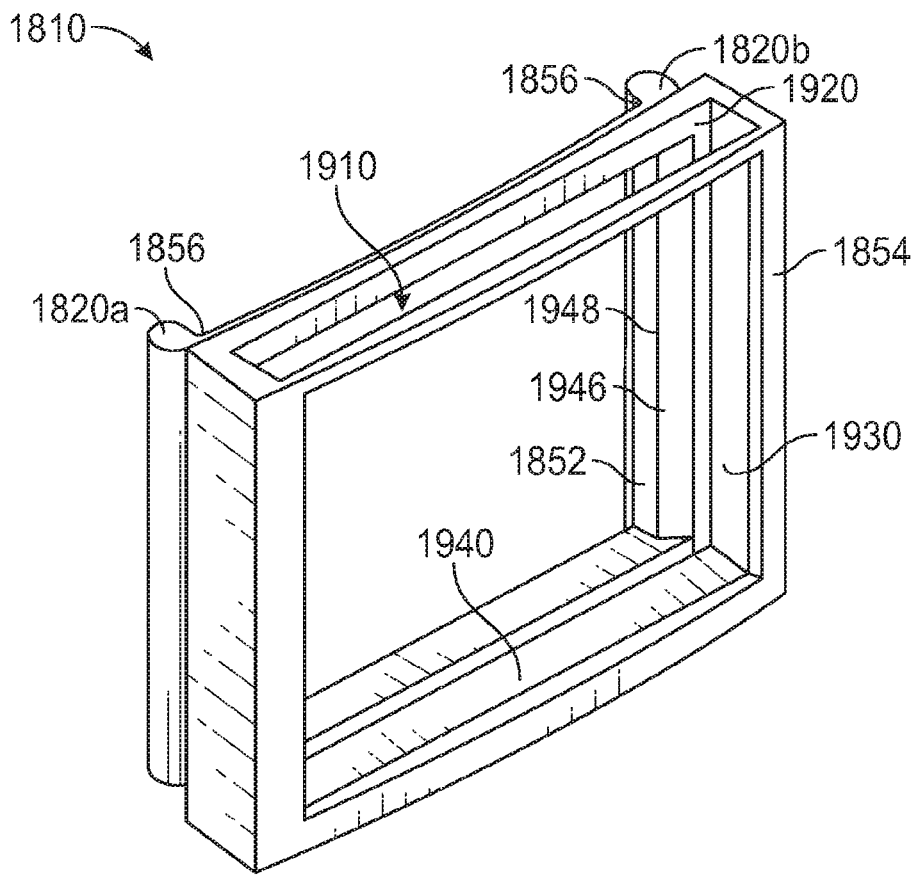
FIG. 19A shows a perspective view of an example of a case of a screening cartridge assembly, according to an example embodiment of the present disclosure.
Figure 19B:
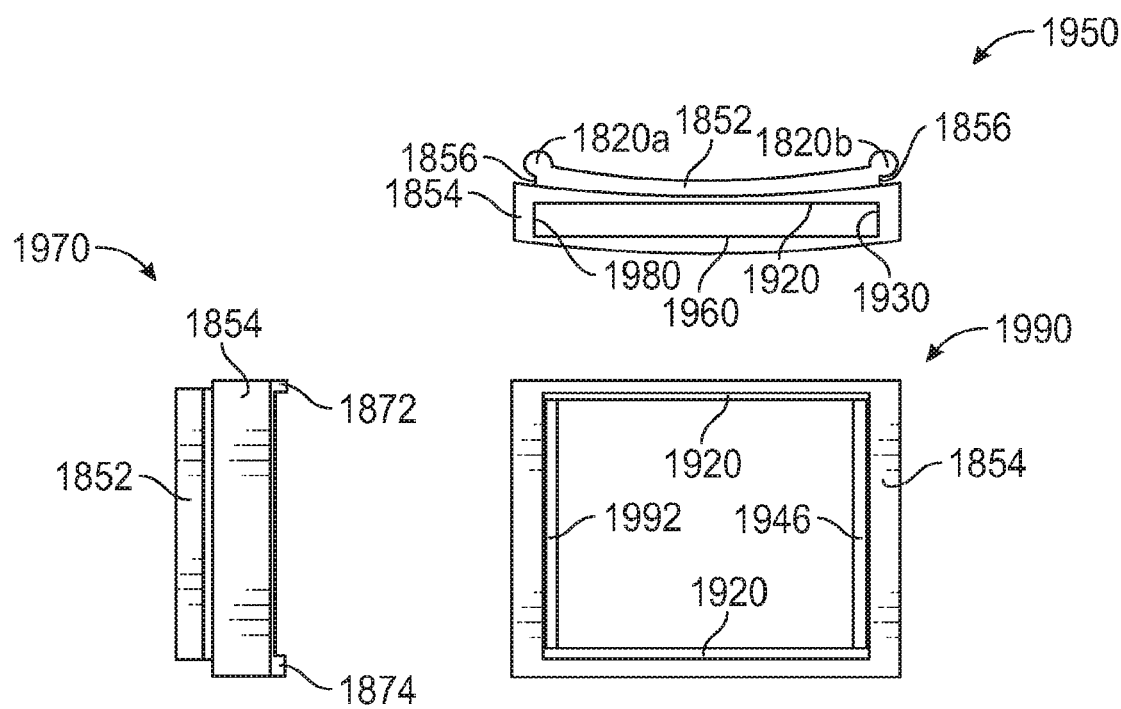
FIG. 19B shows cross-sectional and side views of the example case shown in FIG. 19A. Example dimensions, in units of inches, are presented in the views. The disclosure is not limited to such dimensions, and other dimensions can be contemplated.

As is further illustrated in cross-sectional views 1870 and 1970 in FIG. 18B and FIG. 19B, respectively, the holder frame section 1854 can include a ridge 1872 near the opening configured to receive a screen assembly, and a ridge 1874 near a base of the case 1810.

Figure 19C:
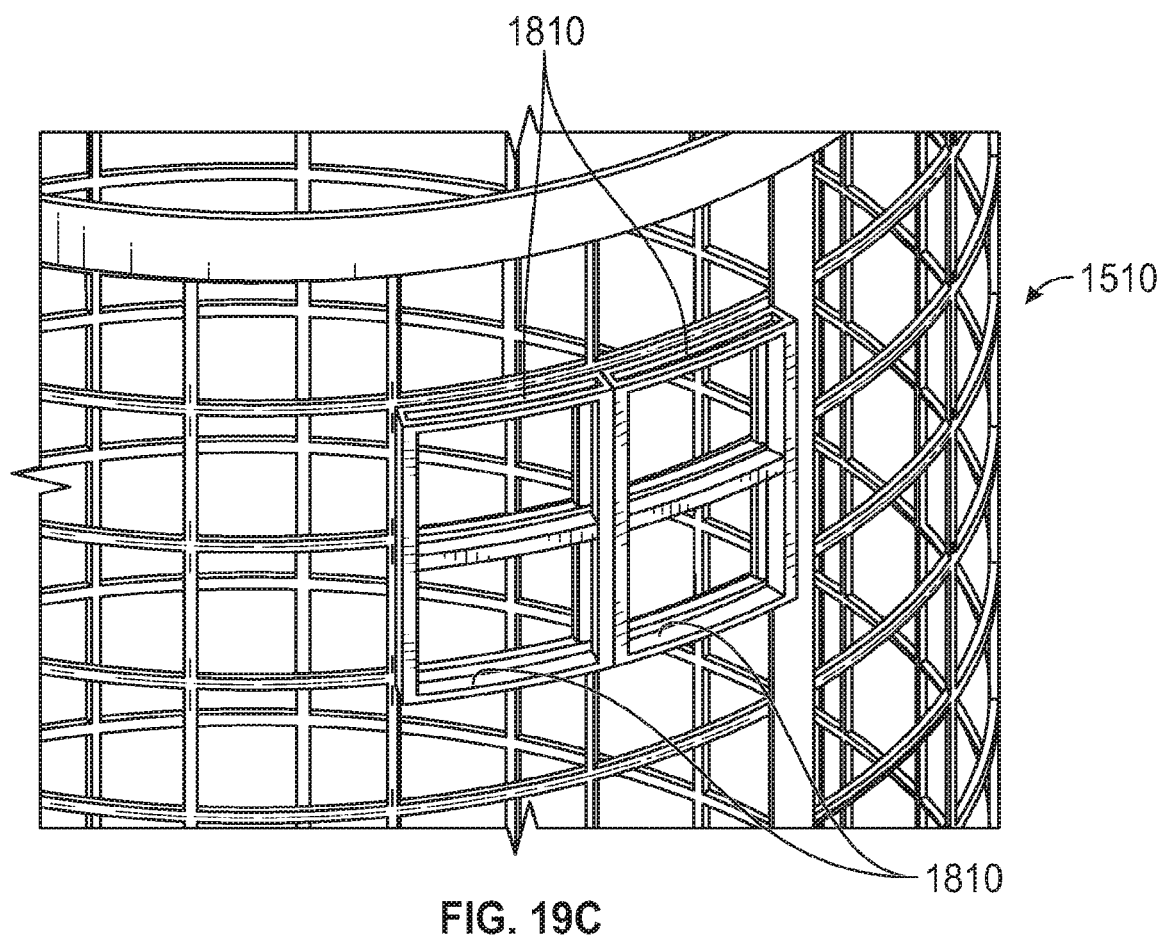
FIG. 19C illustrates an example of multiple cases affixed to a grid frame of a basket cage, according to an example embodiment of the present disclosure.

In addition, with further reference to FIG. 19A, the attachment frame section 1852 includes internal sidewalls, including sidewall 1946 and sidewall 1948, as well as other sidewalls respectively opposite thereto. One of such opposing sidewalls can be gleaned in the side view 1990 in FIG. 19B. Specifically, sidewall 1992 is opposite sidewall 1946. The attachment frame section 1852 also includes the ridge 1820a and the ridge 1820b. In one embodiment, the ridge 1820a and the ridge 1820b and respective portions of the attachment frame section 1852 form respective recesses 1856. Such recesses, as mentioned, can permit or otherwise facilitate mounting (e.g., clipping, clutching, or otherwise engaging) the screening cartridge assembly 1800 to a grid frame of this disclosure, such as grid frame 1510 disclosed hereinbefore. As an illustration, FIG. 19C presents four cases 1810 mounted adjacent to each one another on a grid frame 1510. Respective four screen assemblies can be inserted or otherwise fitted into the four cases 1810 in order to form four screening cartridges and assemble a screen basket for numerous separation processes, such as CIL process, CIP process, water filtration and desalinization, and the like.

Figure 20A:
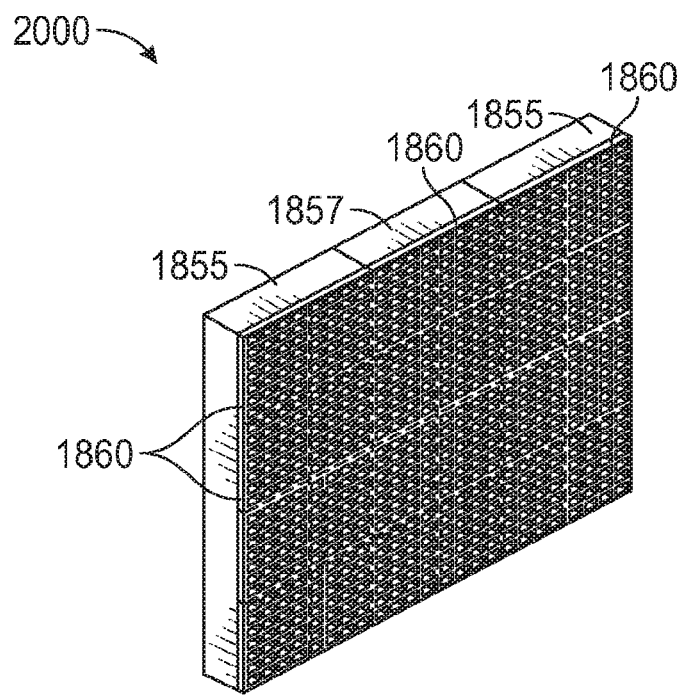
FIG. 20A shows an example of a screen assembly element, according to an example embodiment of the present disclosure.

FIG. 20A illustrates an example of a screen assembly 2000 in accordance with one or more embodiments of the disclosure. The exemplified screen assembly 2000 can be arranged or otherwise fitted within a case 1810 or any other case described herein in order to form a screening cartridge assembly in accordance with this disclosure. Consistent with other screen assemblies disclosed herein, the screen assembly 2000 includes three framework units, which may include two end framework units 1855 and a single medial framework unit 1857, each of the end framework units 1855 and medial framework unit 1857 including screen elements 1860 affixed thereto. The disclosure is not limited to three framework units 1855, 1857 and/or a specific number of screen elements 1860 per framework unit 1855, 1857. In some embodiments, two screen elements 1860 may be affixed thereto to each of three framework units 1855, 1857. In some embodiments, less or additional framework units 1855, 1857 and/or screen elements 1860 can be implemented. Each one (or, in some embodiments, at least one) of the framework units 1855, 1857 can be embodied in a single injection molded piece integrally formed by means of injection molding of a polymer. The framework units 1855, 1857 can be mechanically joined or otherwise secured together to form the screen assembly 2000. To that end, in an embodiment, each one of the framework units 1855, 1857 can include one or more fasteners that can permit or otherwise facilitate fastening a first one of the framework units 1855, 1857 to a second one of the framework units 1855, 1857. Regardless of the mechanism that is utilized or otherwise relied upon to join framework units, the joined framework units 1855, 1857 form a first segmented edge member and an opposing second segmented edge member (not visible in FIG. 20A). The joined framework units 1855, 1857 also includes a first monolithic edge member and a second monolithic edge member (not visible in FIG. 20A) corresponding, respectively, to edge members of the outer framework units 1855, 1857.

Figure 20B:
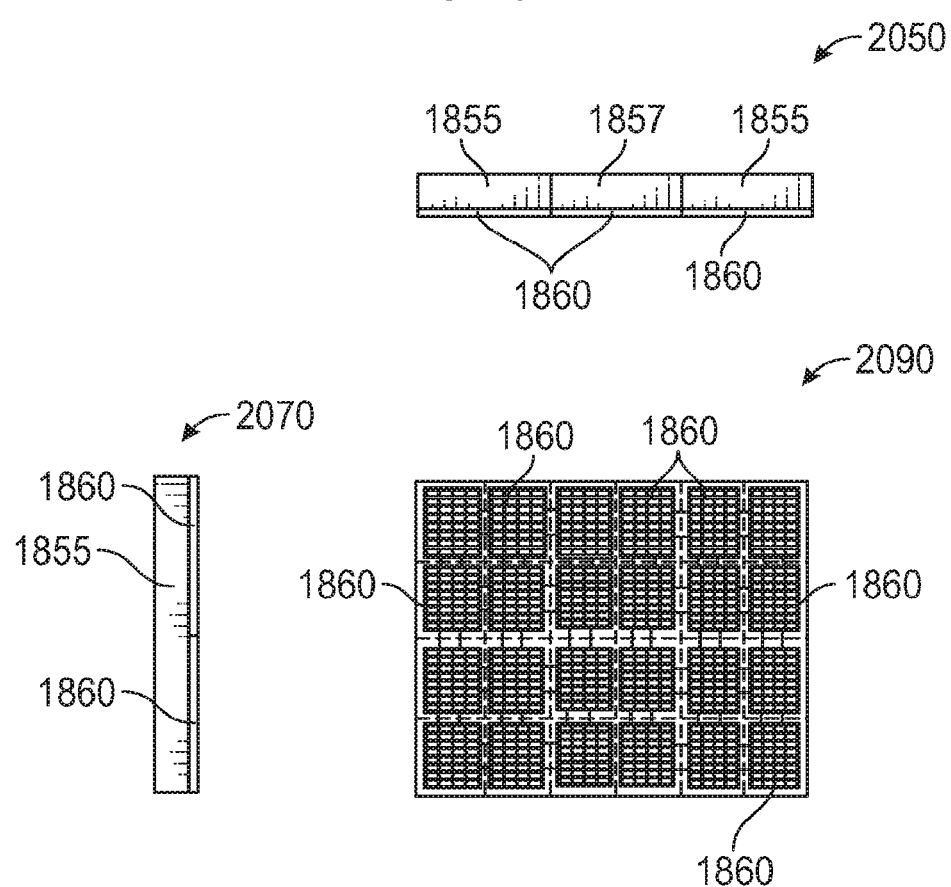
FIG. 20B illustrates cross-sectional and side views of the example screen assembly element shown in FIG. 20A. Example dimensions, in units of inches, are presented in the views. The disclosure is not limited to such dimensions, and other dimensions can be contemplated.

Screen elements 1860 affixed to each one of the framework units 1855, 1857 can form a screening surface of the screen assembly 2000 and a screening cartridge assembly that includes the screen assembly 2000. The screening surface can be essentially seamless, as is illustrated in cross-sectional views 2050 and 2070 of screen assembly 2000 in FIG. 20B. In some embodiments, as is illustrated in the side view 2090 of screen assembly 2000 in FIG. 20B, each one (or, in other embodiments, at least one) of the screen elements 1860 can include four adjacent sections having respective groups of screening openings. Such sections may be separated by support members (represented with dashed lines in the plan view 2090). The disclosure is not limited to screen elements having four sections and, in some embodiments, less or additional sections having screening openings can be implemented.

Figure 21A:
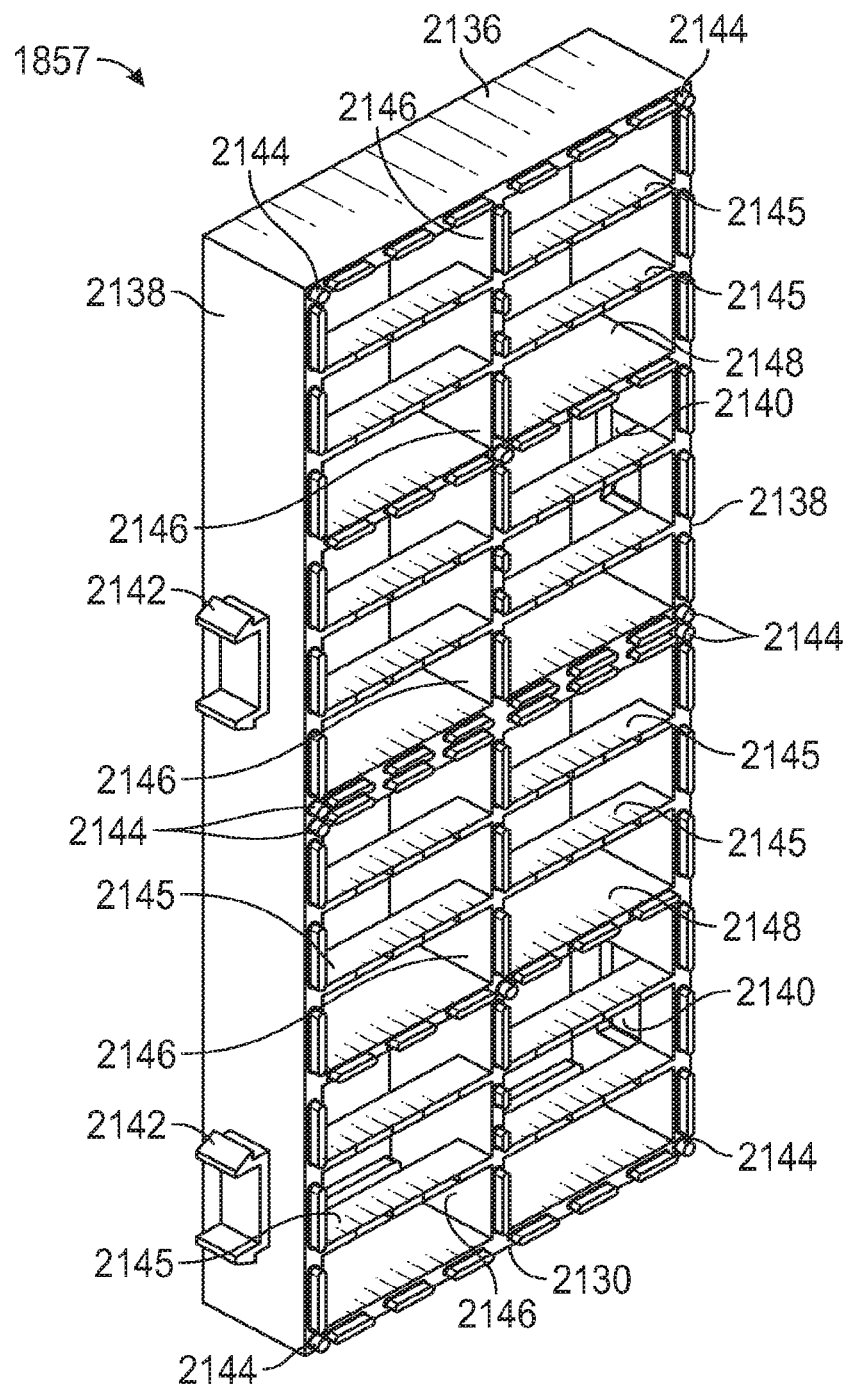
FIG. 21A shows a perspective view of an example of a framework unit of a screen assembly, according to an example embodiment of the present disclosure.

FIG. 21A illustrates a perspective view of medial framework unit 1857 in accordance with one or more embodiments of the disclosure. The medial framework unit 1857 is elongated, and includes longitudinal side members 2138 opposite and substantially parallel to one another. The medial framework unit 1857 also includes transversal side members 2136 opposite and substantially parallel to one another. Each one of the transversal side member 2136 is substantially perpendicular to the longitudinal side members 2138. As mentioned, the medial framework unit 1857 can include fastening mechanisms that permit or otherwise facilitate mechanically joining or otherwise securing together the medial framework unit 1857 and another framework unit (either an end framework unit 1855 or a medial framework unit 1857). Specifically, in some embodiments, the fastening mechanisms can be assembled or otherwise formed on respective portions of the longitudinal side members 2138, with the transversal side members 2136 free from fastening mechanisms. As is illustrated in FIG. 21A, in at least one of such embodiments, the fastening mechanisms can be embodied in or can include clips 2142 and clip apertures 2140. The medial framework unit 1857 and another framework unit (e.g., end framework unit 1855) also having clips 2142 and clip apertures 2140 can be mechanically joined or otherwise secured together along their respective longitudinal side members 2138. To that end, in one embodiment, a clip 2142 of the medial framework unit 1857 can be passed into a clip aperture 2140 of the other framework unit until extended members of the clip 2142 extend beyond the clip aperture 2140 and a longitudinal side member of the other framework unit. As the clip 2142 is pushed into the clip aperture 2140, extended members of the clip 2142 can be forced together until a clipping portion of each extended member is beyond the longitudinal side member of the other framework unit, allowing the clipping portions to engage an interior portion of the longitudinal side member of the other framework unit. When the clipping portions are engaged into the clip aperture 2140, longitudinal side members of two independent framework units can be side by side and secured together (e.g., mechanically joined). The framework units can be separated by applying a force to the extended members of the clips such that the extended members are moved towards each other allowing for the clipping portions to pass out of the clip aperture 2140. Although the fasteners described herein and shown in drawings are clips and clip apertures, the disclosure is not limited in that respect and alternative fasteners and alternative forms of clips and/or apertures can be used, including other mechanical arrangements, adhesives, etc.

The medial framework unit 1857 also includes longitudinal support members 2146 and transversal support members 2148. Each one of the longitudinal support members 2146 is substantially parallel to longitudinal side members 2138 and is substantially perpendicular to the transversal side members 2136. Each one of the transversal support member 2148 is substantially parallel to transversal side members 2136 and is substantially perpendicular to the longitudinal support members 2146. The longitudinal support members 2146 and transversal support members 2148 define, at least in part, multiple grid openings within the medial framework unit 1857. In addition, the longitudinal support members 2146 and the transversal support members 2148 can provide mechanical stability to a screen element that is affixed to the medial framework unit 1857.

Figure 21B:
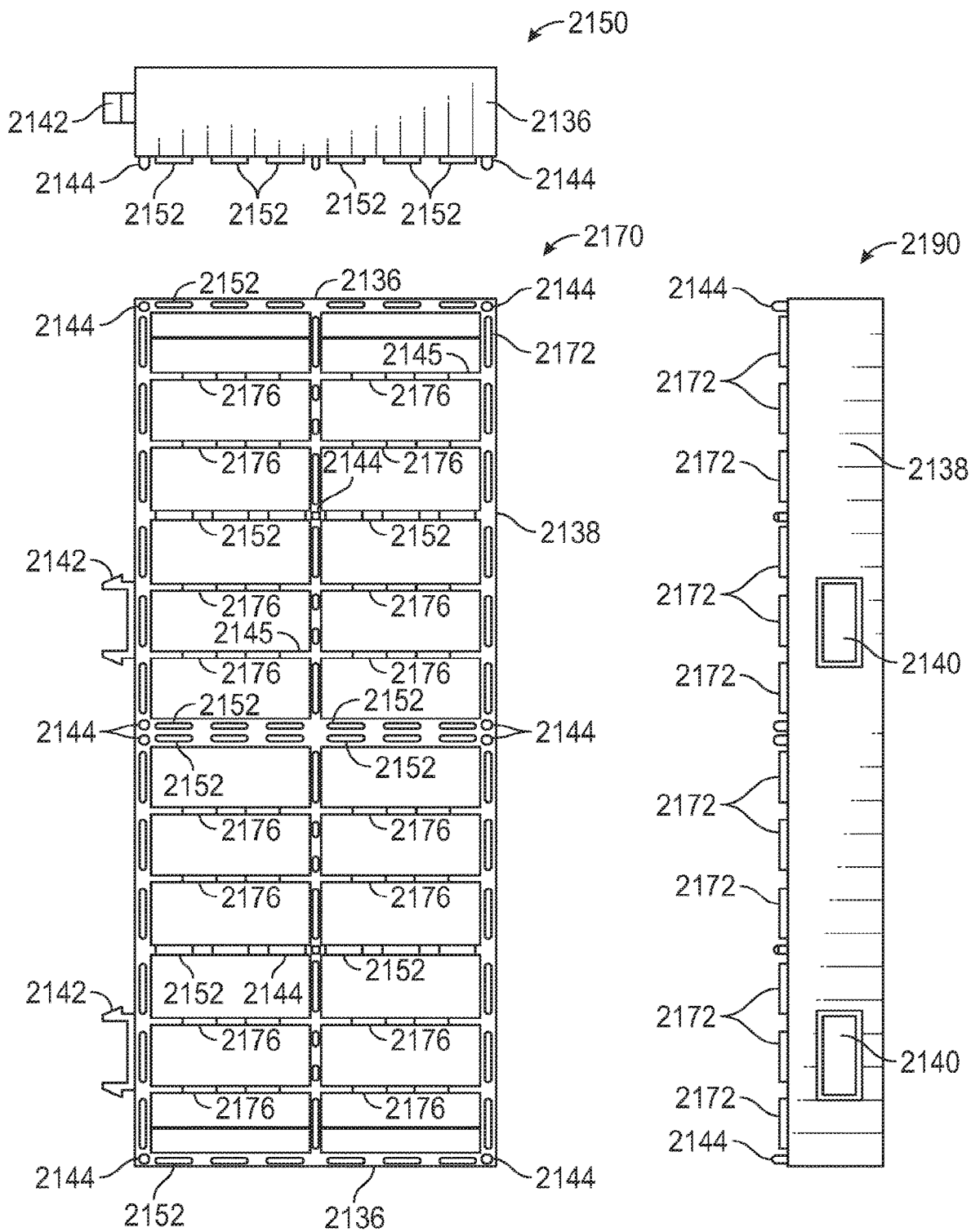
FIG. 21B shows top and side views of the example framework unit shown in FIG. 21A.

The medial framework unit 1857 also can include second transversal support members 2145 substantially perpendicular to the longitudinal side members 2138. As is illustrated in FIG. 21A and the side view 2170 in FIG. 21B, the second transversal support members 2145 can be distributed across the grid openings in the medial framework unit 1857. The second transversal support members 2145 can provide further mechanical stability to the screen element that is affixed to the medial framework unit 1857.

In order to permit or otherwise facilitate affixing one or more screen elements to the medial framework unit 1857, attachment members 2144 and several adhesion arrangements are included in the medial framework unit 1857. As is illustrated in side view 2190 of medial framework unit 1857 shown in FIG. 21B, a first adhesion arrangement includes multiple fusion bars 2172 assembled (e.g., formed) on surfaces of the longitudinal side members 2138. As is shown in the top view 2150 of medial framework unit 1857 of FIG. 21B, a second adhesion arrangement includes multiple fusion bars 2152 assembled (e.g., formed) on surfaces of the transversal side members 2136 and transversal support members 2148. As is shown in the side view 2170 of medial framework unit 1857 of FIG. 21B, a third adhesion arrangement includes multiple fusion bars 2176. In some embodiments, fusion bars 2176 can have a height that is less than a height of the fusion bars 2172, and also less than a height of the fusion bars 2152.

In some embodiments, the attachment members 2144 can permit or otherwise facilitate aligning a screen element for laser welding to the medial framework unit 1857 or another type of framework unit disclosed herein. The attachment members 2144 and/or the various fusion bars can be melted during laser welding.

End framework units 1855 can have similar structure to that of a medial framework unit 1857. Fastening mechanisms in an end framework unit 1855 can be included in a single longitudinal side member of the framework unit 1855.

Figure 22A:
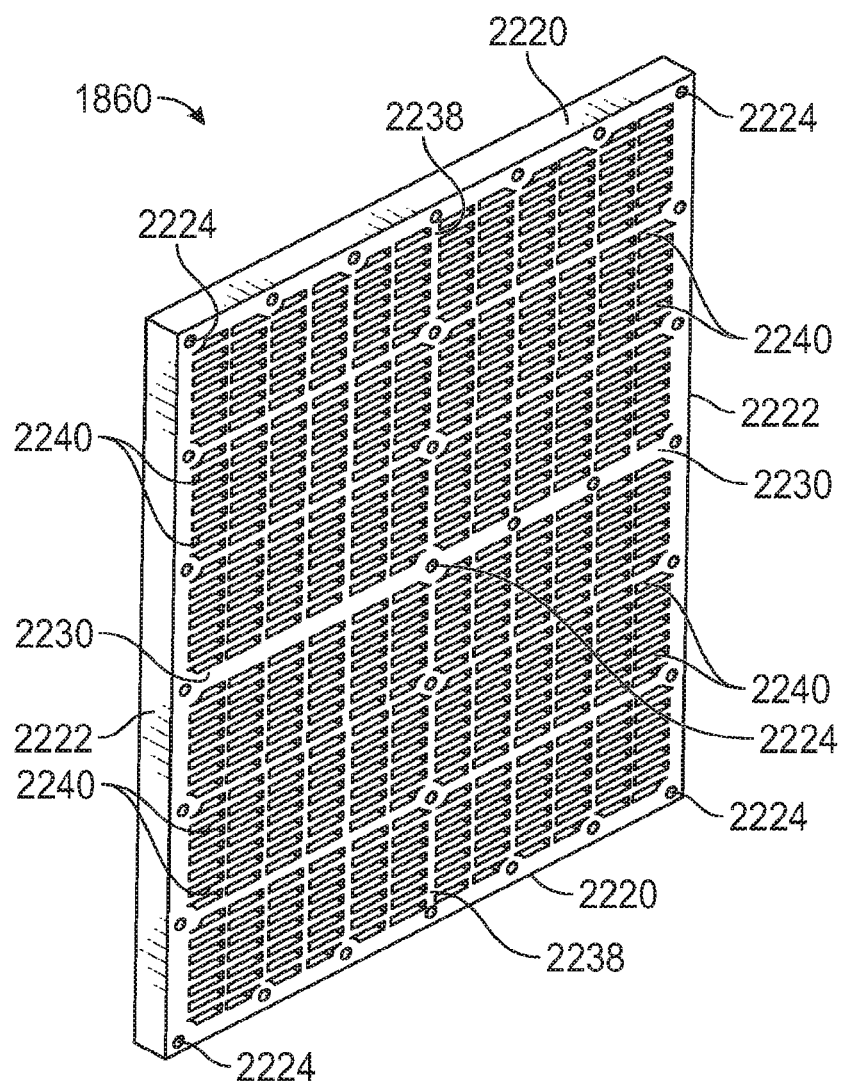
FIG. 22A shows an example of a screen element of a screen assembly, according to an example embodiment of the present disclosure.

In some embodiments, a screen element can be embodied in or can include the screen element 1860 as is illustrated in FIG. 22A. The screen element 1860 includes first side portions 2220 and second side portions 2222 that form a seamless periphery. The first side portions 2220 are substantially parallel to one another, and each one of the first side portions 2220 is substantially perpendicular to the second side portions 2222. Similarly, the second side portions 2222 are substantially parallel to one another, and each one of the second side portions 2222 is substantially perpendicular to the first side portions 2220. Each one of the side portions 2220 is configured to rest on and be affixed to transversal side members (e.g., members 2136) of a framework unit 1855, 1857 (e.g., medial framework unit 1857) in accordance with embodiments of this disclosure. As such, each one of the side portions 2220 can include cavities configured to receive or otherwise engage fusion bars on a surface of the transversal side members. Similarly, side portions 2222 are configured to rest on longitudinal side members of a framework unit 1855, 1857 (e.g., framework unit 1857) in accordance with this disclosure. Thus, each one of the side portions 2222 includes cavities configured to receive or otherwise engage fusion bars on a respective surface of the longitudinal side members.

The screen element 1860 also includes several support members. More specifically, the screen element 1860 includes support members 2230 and support members 2238. Support members 2230 are substantially collinear and substantially perpendicular to support members 2238. Support members 2238 also are substantially collinear. The screen element 1860 also includes supports members 2240 that extend from a first one of the side portions 2222 to a second one of the second side portions 2222. Each one of the support members 2230, 2238, and 2240 are configured to rest on or be affixed to respective support members of a framework unit 1855, 1857, such as medial framework unit 1857. Thus, each one of the support members 2230, 2238, and 2240 includes cavities configured to receive or otherwise engage fusion bars on a respective surface of support members of the framework unit.

The screen element 1860 further includes attachment apertures 2224. One of the attachment apertures 2224 is positioned essentially at the center of the screen element 1860. Other attachment apertures 2224 are positioned at respective corners of the seamless periphery of the screen element 1860. Regardless of position in the screen element 1860, each one (or, in some embodiments, at least one) of the attachment apertures 2224 is configured to permit or otherwise facilitate passage of an elongated attachment member 2144 (e.g., FIG. 21A) can pass through the attachment aperture 2224. In one or more of such embodiments, the attachment apertures 2224 may include a tapered bore that may be filled when a portion of the elongated attachment member 2144 above a screening surface of the screen element 1860 is melted, fastening screen element 1860 to the medial framework unit 1857 or to another type of framework unit disclosed herein. In other embodiments, the attachment apertures 2224 can be configured without a tapered bore, permitting formation of a bead on a screening surface 2013 of the screen element 1860 when a portion of an elongated attachment member 2144 above such a screening surface is melted, fastening the screen element 1860 to the medial framework unit 1857 or to another type of framework unit disclosed herein. The screen element 1860 can cover a half portion of the medial framework unit 1857 (or another type of framework unit disclosed herein), and each one of the four sections included in the screen element 1860 can respectively cover four grid openings of the medial framework unit 1857.

Figure 22B:
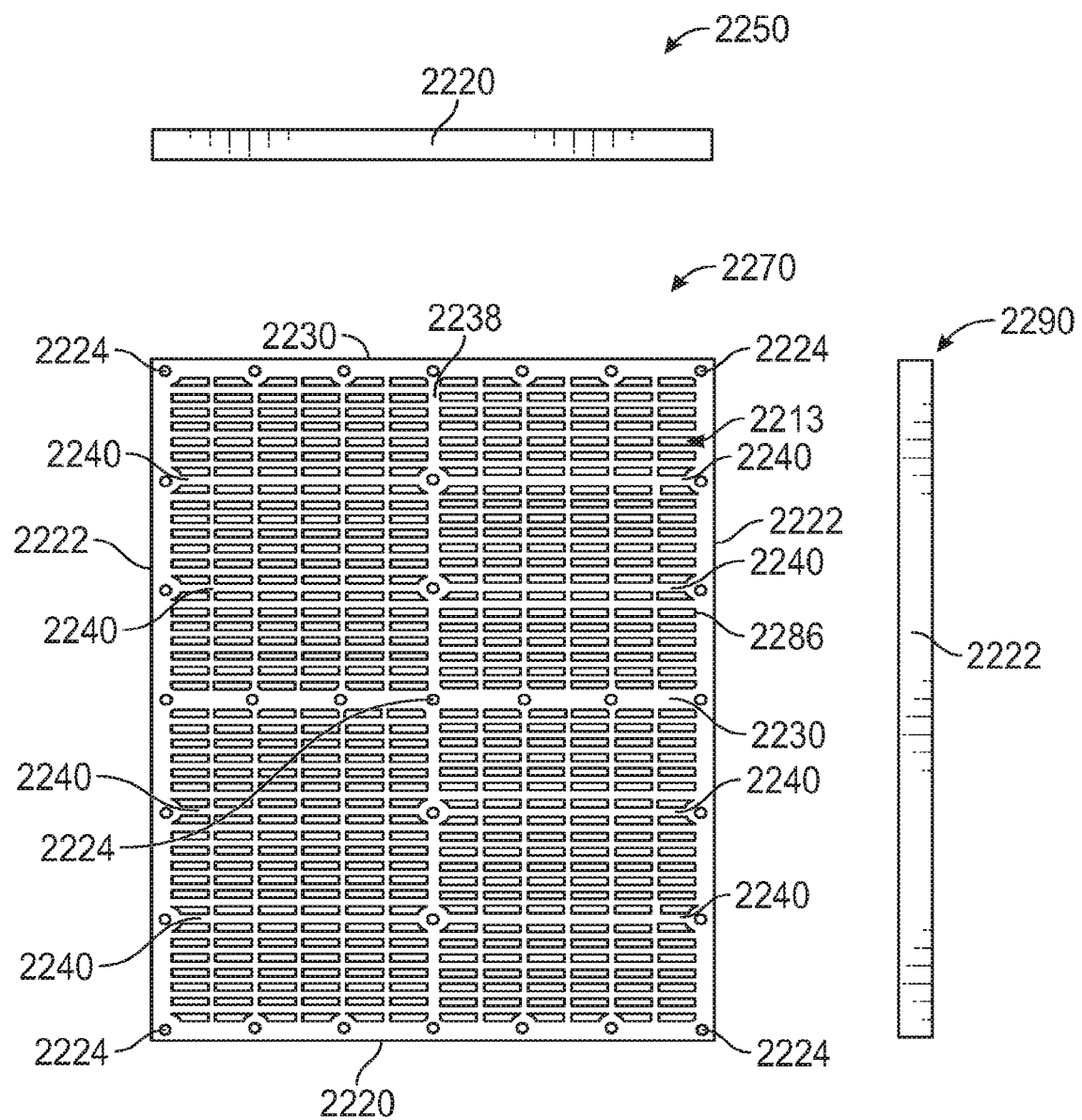
FIG. 22B shows top and side views of the example screen element shown in FIG. 22A.

The screening surface 2213 has multiple screening openings. Each one (or, in some embodiments, at least some) of the multiple screening opening can be elongated and can have a defined length and defined width having respective magnitudes based on the screening application (e.g., CIL process, CIP process, ore treatment, water desalinization, or the like) in which the screen element 1860 is utilized. In some embodiments, the multiple screening openings can have a same substantially uniform length having a magnitude in a range from about 300 µm to 4000 µm. In addition, the multiple screening openings can have a same substantially uniform width having a magnitude in a range from about 35 µm to about 4000 µm. As an illustration, in some embodiments, the magnitude of width can be approximately equal to one of 43 µm, 74 µm, 90 µm, 104 µm, 125 µm, 150

μm, 180 μm, 500 μm, 700 μm, or 1000 μm (1 mm). In an example embodiment, the multiple screening openings can have a substantially uniform length having a magnitude of about 500 μm. As is illustrated in FIG. 22A and FIG. 22B (depicting top and side views 2250, 2270, and 2290 of screen element 1860), the multiple openings can be arranged in sections, with screening openings in a section arranged in a lattice. Each one of the sections is defined, at least in part, by support members 2230, 2238, and 2240 of the screen element 1860. In one embodiment, screening openings that are adjacent to a periphery of the screen element 1860 can be defined by longitudinal bars parallel to first side portions of the screen element 1860, transversal bars perpendicular to the longitudinal bars, and segments of edges of side portions of the screen element 1860. In addition, screen openings that are in the interior portion of a section can be defined by longitudinal bars and transversal bars. Longitudinal bars define a major side of the elongated openings, and transversal bars define a minor side of elongated openings.

Figure 23A:
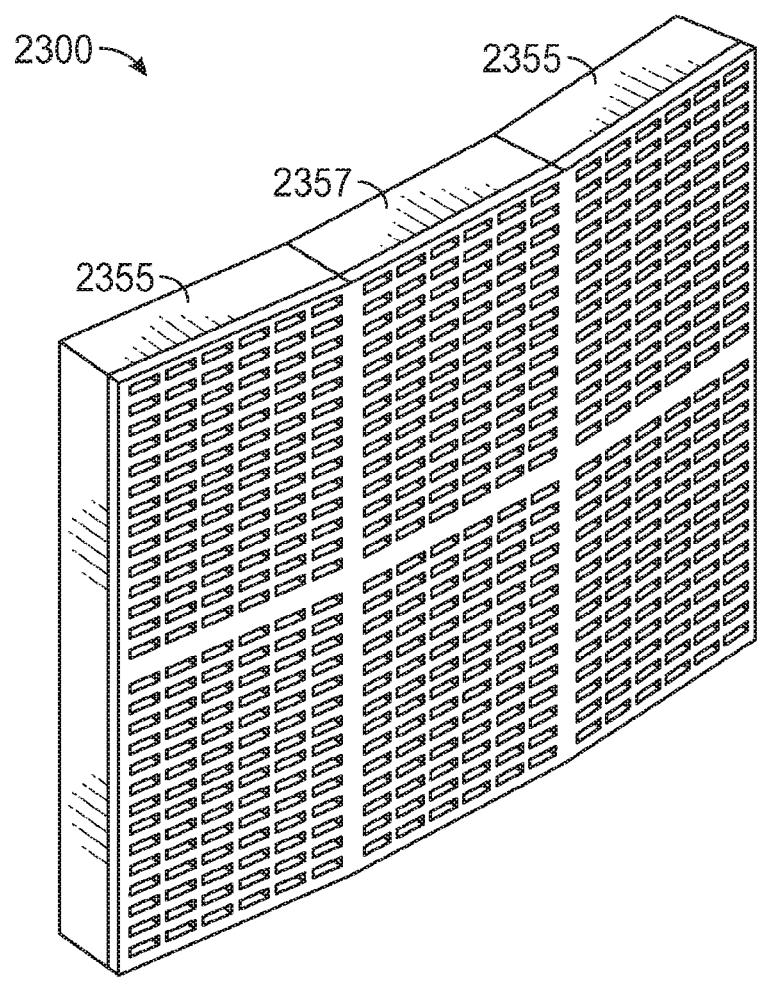
FIG. 23A shows another example of a screen assembly element, according to an example embodiment of the present disclosure.
Figure 23B:
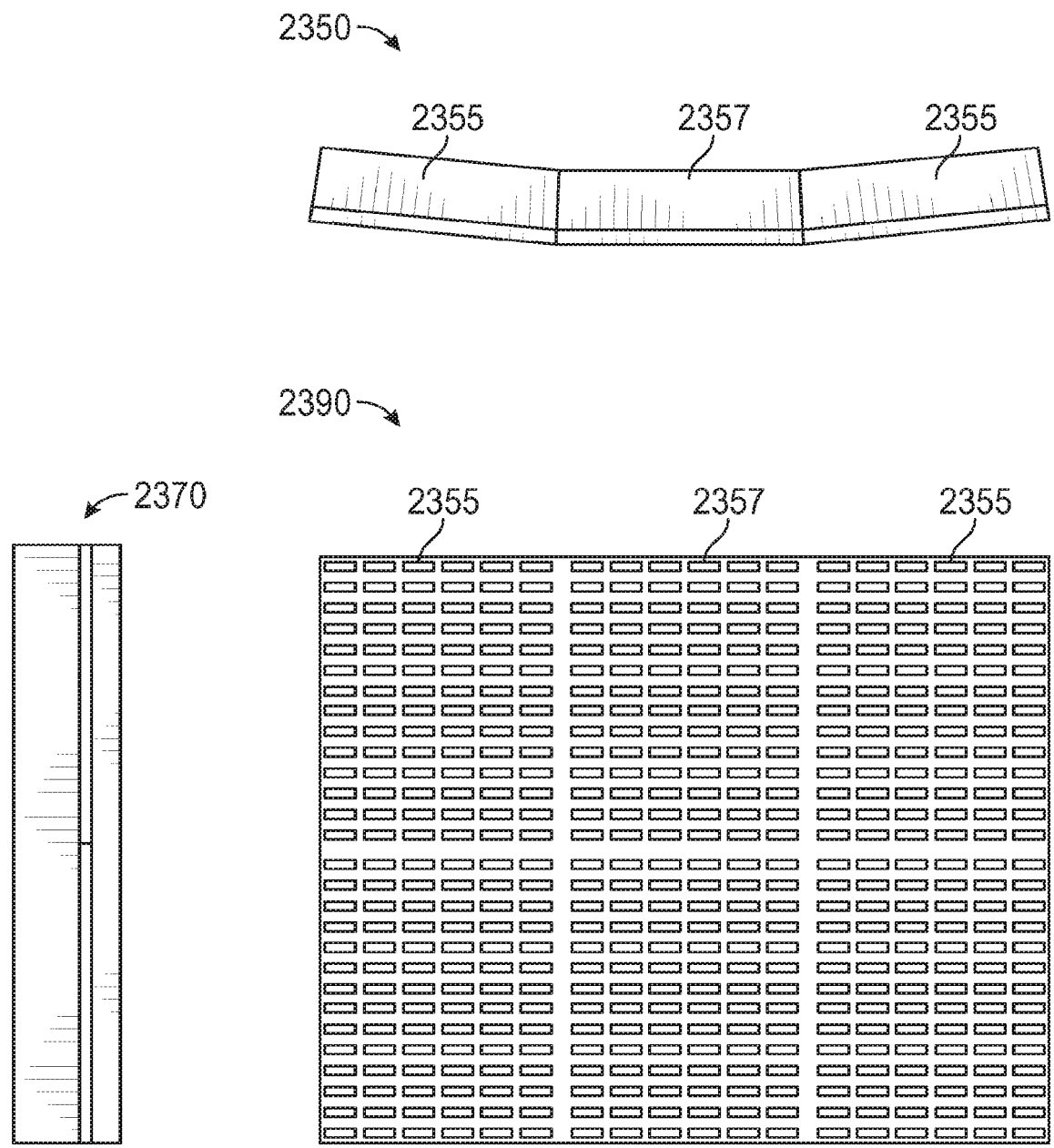
FIG. 23B shows side views of the example screen assembly element shown in FIG. 23A.

As is illustrated in FIGS. 23A and 23B, some embodiments may include fastening mechanisms in framework units (either medial framework units 2357 or end framework units 2355) that can permit or otherwise facilitate assembling a screen assembly 2300 that has certain curvature. In one of such embodiments, the fastening mechanisms can include clips and clip apertures such that the screen assembly 2300 that is assembled is curved rather than substantially planar, as shown in the side views 2350, 2570, and 2390 of curved screen assembly 2300 shown in FIG. 23B.

Figure 24:
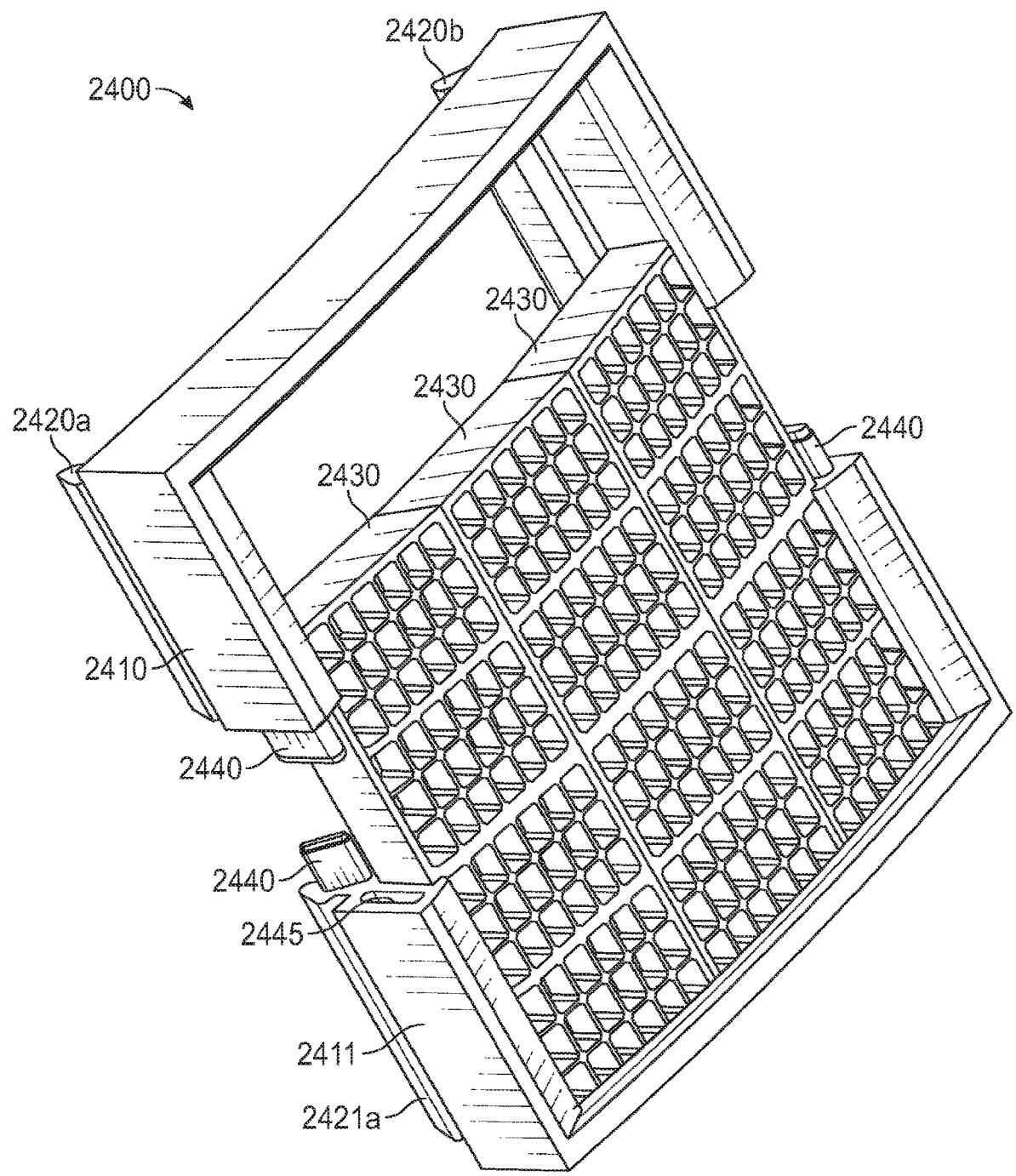
FIG. 24 shows an example of a cartridge screen element, according to an example embodiment of the present disclosure.
Figure 25:
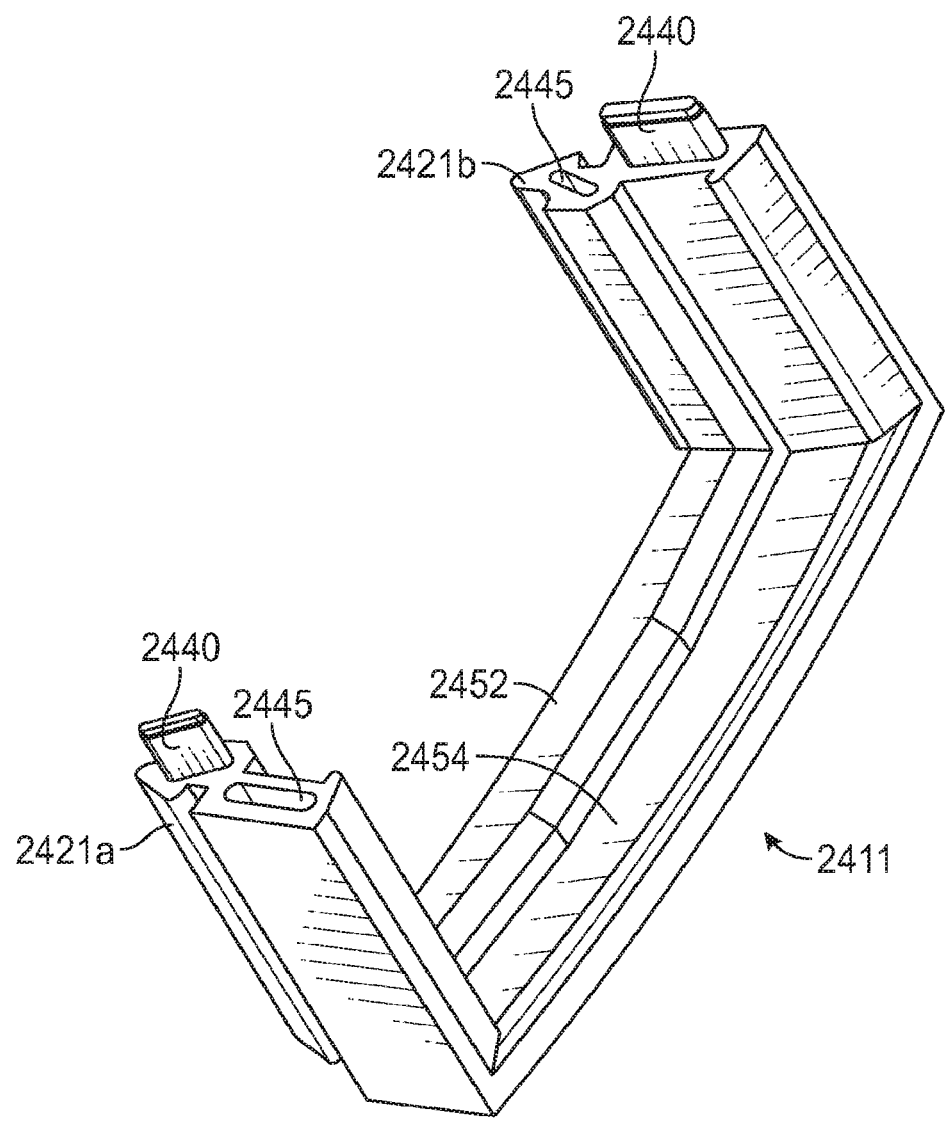
FIG. 25 shows an example of a bottom case portion of the cartridge screen element shown in FIG. 25.

FIG. 24 and FIG. 25 illustrate an alternative embodiment of a cartridge assembly 2400 for use in a screening basket of the disclosure. Cartridge assembly 2400 includes a detachable case with top case portion 2410 and a separate bottom case portion 2411. Top case portion 2410 and bottom case portion 2411 each include attachment mechanisms 2440 that may be detachably engaged with apertures 2445 featured on the top case portion 2410 and bottom case portion 2411. In use, screen assembly having screen units 2430 may be fitted into a top or bottom case portion 2410, 2411, and the opposing case portion may then be fitted around the screen assembly with screening units 2430. Attachment mechanisms 2440 engage the apertures 2445, securing the screen assembly with screening units 2430 securely within the case.

Detachable case with top case portion 2410 and bottom case portion 2411 includes substantially the same features as case 1810 discussed herein, including an attachment frame section, holder frame section, and ridges. As shown in the perspective view of bottom case portion 2411 illustrated in FIG. 25, attachment frame section 2452 includes internal sidewalls and attachment ridges 2420a and 2420b permit or otherwise facilitate mounting (e.g., clipping, clutching, or otherwise engaging) the screening cartridge assembly 2410 to a grid frame of this disclosure, such as grid frame 1510. Holder frame section 2454 can receive and/or hold the screen assembly formed by screen units, in a manner substantially similar to that of holder frame section 1854 of case 1800 discussed in more detail herein.

Top case portion 2410 and bottom case portion 2411 may each be formed of a single injection molded piece integrally formed by means of injection molding a polyurethane, a thermoset polymer, or other types of polymer. Due to the relative simplicity of separate top case portion 2410 and bottom case portion 2411, as related to a single case (such as case 1810), the top case portion 2410 and bottom case portion 2411 may more easily be created by an injection-molding process. Example embodiments of the injection molded process are discussed in more detail in the disclosures of U.S. patent application Ser. No. 13/800,826, U.S. Pat. Nos. 9,409,209, 9,884,344, U.S. patent application Ser. No. 15/851,009, U.S. patent application Ser. No. 15/965,195, and the cross-references included therein, which are incorporated by reference herein in their entireties.

Figure 26:
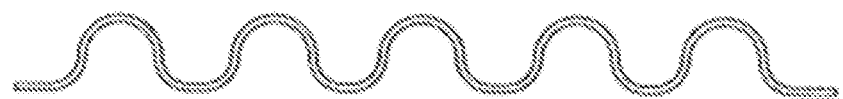
FIG. 26 is a first front cross-sectional profile view of a screen element, according to an example embodiment of the present invention.
Figure 27:
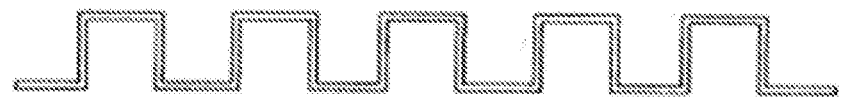
FIG. 27 is a second front cross-sectional profile view of a screen element, according to an example embodiment of the present invention.
Figure 28:
FIG. 28 is a third front cross-sectional profile view of a screen element, according to an example embodiment of the present invention.

FIGS. 26 to 28 show cross-sectional profile views of exemplary embodiments of thermoplastic injection molded screen element surface structures that may be incorporated into the various embodiments of the present invention discussed herein. The screen element is not limited to the shapes and configurations identified herein. Because the screen element is thermoplastic injection molded, multiple variations may be easily fabricated and incorporated into the various exemplary embodiments discussed herein.

While the embodiments of the present disclosure are described with reference to various implementations and exploitations, it will be understood that these embodiments are illustrative and that the scope of the embodiments of the present disclosure is not limited to them. Many variations, modifications, additions, and improvements are possible. The above description should therefore not be construed as limiting, but merely as exemplifications of particular embodiments.

What is claimed is:

1. A screening apparatus, comprising:
a screen assembly including:
a case with a holder section and an attachment section, wherein the case is a detachable case including a top case portion and a bottom case portion separable from the top case portion, and
a screen having a framework with structural members that form grid openings and at least one screen element that is secured to the framework, each screen element having a synthetic screening surface,
wherein the screen is removably securable within the holder section of the case,
wherein the synthetic screening surface of each screen element has openings having sizes in a range from approximately 35 microns to approximately 1,000 microns,
wherein the attachment section of the case is configured to removably attach the screen assembly to a frame of a screen basket such that the synthetic screening surface is located on the outside of the screen basket,
wherein the screen basket is configured to be secured in a fixed vertical configuration, and the synthetic screening surface is configured to separate an oversize material from an undersize material by allowing undersize material to flow into the screen basket while preventing oversize material from entering the screen basket, and
wherein the synthetic screening surface is configured to separate carbon or resin from a slurry of carbon-in-leach (CIL), carbon-in-pulp (CIP) or resin-in-leach (RIL) material as fluid of the slurry flows from outside the screen basket to inside the screen basket due, at least in part, to a static pressure differential between fluid outside relative to fluid inside the screen basket such that carbon or resin is retained on the synthetic screening surface.

2. The screening apparatus of claim 1 wherein each at least one screen element is formed of a thermoplastic material.

3. The screening apparatus of claim 1 wherein each at least one screen element comprises a single injection molded piece integrally formed by injection molding of a thermoplastic material.

4. The screening apparatus of claim 1,
wherein each of the top case portion and the bottom case portion includes one or more attachment mechanisms and one or more apertures,
wherein each attachment mechanism of the top case portion is configured to detachably engage with a corresponding aperture of the bottom case portion, and
wherein each attachment mechanism of the bottom case portion is configured to detachably engage with a corresponding aperture of the top case portion.

5. A screening apparatus, comprising:
a screen assembly that includes:
   a case with a holder section and an attachment section, wherein the case is a detachable case including a top case portion and a bottom case portion separable from the top case portion, and
   a screen having a framework with structural members that form grid openings and at least one screen element that is secured to the framework, each screen element having a synthetic screening surface,
wherein the screen is removably securable within the holder section of the case,
wherein the attachment section of the case is configured to be attached to a grid frame such that the synthetic screening surface is located on the outside of the grid frame, the synthetic screening surface configured to separate carbon or resin from a slurry of carbon-in-leach (CIP), resin-in-leach (RIL) or resin-in-leach (RIL) material as fluid of the slurry flows from outside the grid frame to inside the grid frame such that carbon or resin is retained on the synthetic screening surface.

6. The screening apparatus of claim 5, wherein the synthetic screening surface includes a thermoset material.

7. The screening apparatus of claim 5, wherein the synthetic screening surface includes a plurality of screening openings each having a length L that has a magnitude in a range from approximately 0.7 mm to approximately 2 mm, and a width W that has a magnitude in a range of about 35 microns to about 150 microns.

8. The screen screening apparatus of claim 5, wherein the synthetic screening surface includes a thermoplastic material.

9. The screening apparatus of claim 5, wherein the synthetic screening surface includes a polyurethane material having openings having sizes in a range from approximately 35 microns to approximately 4,000 microns.

10. The screening apparatus of claim 5, wherein each at least one screen element is a single injection-molded piece.

11. The screening apparatus of claim 5, wherein the synthetic screening surface has a corrugated shape.

12. The screening apparatus of claim 5, wherein the screen assembly is configured to cover at least one opening of the grid frame.

13. The screening apparatus of claim 5, wherein the screen includes a plurality of separate screen elements.

14. The screening apparatus of claim 13, wherein the case of the screen assembly includes a molded body having screen openings and unperforated side edge portions,
wherein each side edge portion includes a cast-in structural member that is configured to mechanically couple with a transversal member or a longitudinal member of the grid frame to thereby attach the screen assembly to the grid frame.

15. The screening apparatus of claim 5, wherein the grid frame has a cylindrical configuration.

* * * * *